United States Patent

Hamamura

(10) Patent No.: US 6,847,734 B2
(45) Date of Patent: Jan. 25, 2005

(54) WORD RECOGNITION METHOD AND STORAGE MEDIUM THAT STORES WORD RECOGNITION PROGRAM

(75) Inventor: Tomoyuki Hamamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 729 days.

(21) Appl. No.: 09/769,378

(22) Filed: Jan. 26, 2001

(65) Prior Publication Data

US 2001/0016074 A1 Aug. 23, 2001

(30) Foreign Application Priority Data

Jan. 28, 2000 (JP) ........................................ 2000-020300

(51) Int. Cl.[7] ............................................... G06K 9/72
(52) U.S. Cl. ..................... 382/229; 382/160; 382/177; 382/187; 382/228; 700/93; 704/240; 704/251; 715/531; 715/541
(58) Field of Search ........................... 700/93; 704/240, 704/251; 715/531, 541; 382/156–161, 177–179, 186–189, 226–231

(56) References Cited

U.S. PATENT DOCUMENTS

| | | | | |
|---|---|---|---|---|
| 5,459,809 A | * | 10/1995 | Kim et al. ................. | 382/160 |
| 5,606,644 A | * | 2/1997 | Chou et al. ................ | 704/243 |
| 5,680,511 A | * | 10/1997 | Baker et al. ............... | 704/257 |
| 5,727,081 A | * | 3/1998 | Burges et al. ............. | 382/229 |
| 6,005,973 A | * | 12/1999 | Seybold et al. ............ | 382/187 |
| 6,694,056 B1 | * | 2/2004 | Ito et al. ..................... | 382/186 |

FOREIGN PATENT DOCUMENTS

| | | |
|---|---|---|
| JP | 8-167008 | 6/1996 |
| JP | 10-177624 | 6/1998 |

OTHER PUBLICATIONS

Abe et al: Trans. Inst. Electron, Inf. Commun. Eng. (C) (Japan) vol. 52–C, No. 6, Jun. 1969, pp. 305–312.

* cited by examiner

*Primary Examiner*—Yon J. Couso
*Assistant Examiner*—Gregory Desire
(74) *Attorney, Agent, or Firm*—Pillsbury Winthrop LLP

(57) ABSTRACT

In word recognition using the character recognition result, recognition processing is performed for an input character string that corresponds to a word to be recognized, a probability at which characteristics obtained as the result of character recognition are generated by conditioning characters of words contained in a word dictionary that stores in advance candidates of words to be recognized. The thus obtained probability is divided by a probability at which characteristics obtained as the result of character recognition are generated, and each of the division results obtained relevant to the characters of the words contained in the word dictionary is multiplied relevant to all the characters. The recognition results of the above words are obtained based on the multiplication results.

20 Claims, 10 Drawing Sheets

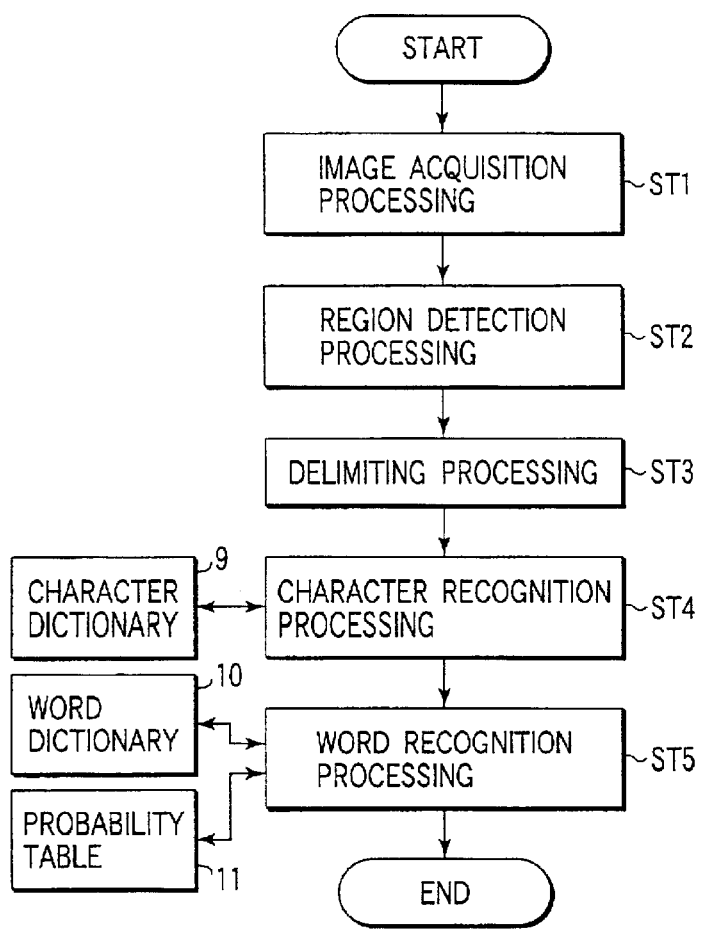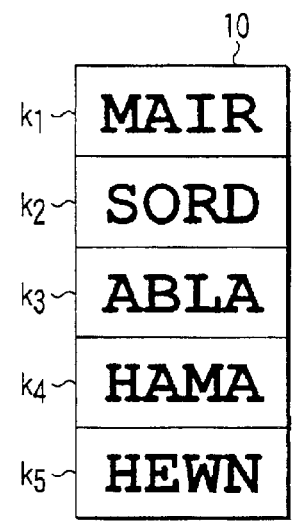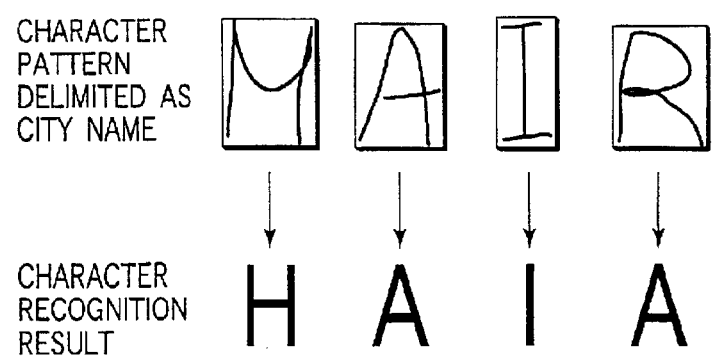
FIG. 3
FIG. 5
FIG. 4

CHARACTER RECOGNITION RESULT

| | A | B | C | ... | H | ... | M | ... | R | ... | Z |
|---|---|---|---|---|---|---|---|---|---|---|---|
| A | 0.5 | 0.02 | 0.02 | | 0.02 | | 0.02 | | 0.02 | | 0.02 |
| B | 0.02 | 0.5 | 0.02 | | 0.02 | | 0.02 | | 0.02 | | 0.02 |
| C | 0.02 | 0.02 | 0.5 | | 0.02 | | 0.02 | | 0.02 | | 0.02 |
| ⋮ | | | | | | | | | | | |
| H | 0.02 | 0.02 | 0.02 | | 0.5 | | 0.02 | | 0.02 | | 0.02 |
| ⋮ | | | | | | | | | | | |
| M | 0.02 | 0.02 | 0.02 | | 0.02 | | 0.5 | | 0.02 | | 0.02 |
| ⋮ | | | | | | | | | | | |
| R | 0.02 | 0.02 | 0.02 | | 0.02 | | 0.02 | | 0.5 | | 0.02 |
| ⋮ | | | | | | | | | | | |
| Z | 0.02 | 0.02 | 0.02 | | 0.02 | | 0.02 | | 0.02 | | 0.5 |

(WRITTEN ACTUALLY CHARACTER) ~11

F I G. 6

CHARACTER RECOGNITION RESULT

| | A | B | C | ... | H | ... | M | ... | R | ... | Z |
|---|---|---|---|---|---|---|---|---|---|---|---|
| A | 0.42 | 0.02 | 0.02 | | 0.02 | | 0.02 | | 0.1 | | 0.02 |
| B | 0.02 | 0.5 | 0.02 | | 0.02 | | 0.02 | | 0.02 | | 0.02 |
| C | 0.02 | 0.02 | 0.5 | | 0.02 | | 0.02 | | 0.02 | | 0.02 |
| ⋮ | | | | | | | | | | | |
| H | 0.02 | 0.02 | 0.02 | | 0.32 | | 0.2 | | 0.02 | | 0.02 |
| ⋮ | | | | | | | | | | | |
| M | 0.02 | 0.02 | 0.02 | | 0.2 | | 0.32 | | 0.02 | | 0.02 |
| ⋮ | | | | | | | | | | | |
| R | 0.1 | 0.02 | 0.02 | | 0.02 | | 0.02 | | 0.42 | | 0.02 |
| ⋮ | | | | | | | | | | | |
| Z | 0.02 | 0.02 | 0.02 | | 0.02 | | 0.02 | | 0.02 | | 0.5 |

(Rows: WRITTEN ACTUALLY CHARACTER) ~11

F I G. 7

CHARACTER RECOGNITION RESULT

|  | A | B | C | ... | H | I | ... | L | ... | N | ... | T | ... | Z |
|---|---|---|---|---|---|---|---|---|---|---|---|---|---|---|
| A | 0.5 | 0.02 | 0.02 |  | 0.02 | 0.02 |  | 0.02 |  | 0.02 |  | 0.02 |  | 0.02 |
| B | 0.02 | 0.5 | 0.02 |  | 0.02 | 0.02 |  | 0.02 |  | 0.02 |  | 0.02 |  | 0.02 |
| C | 0.02 | 0.02 | 0.4 |  | 0.02 | 0.02 |  | 0.12 |  | 0.02 |  | 0.02 |  | 0.02 |
| ⋮ |  |  |  |  |  |  |  |  |  |  |  |  |  |  |
| H | 0.02 | 0.02 | 0.02 |  | 0.4 | 0.02 |  | 0.02 |  | 0.12 |  | 0.02 |  | 0.02 |
| I | 0.02 | 0.02 | 0.02 |  | 0.02 | 0.4 |  | 0.02 |  | 0.02 |  | 0.12 |  | 0.02 |
| ⋮ |  |  |  |  |  |  |  |  |  |  |  |  |  |  |
| L | 0.02 | 0.02 | 0.12 |  | 0.02 | 0.02 |  | 0.4 |  | 0.02 |  | 0.02 |  | 0.02 |
| ⋮ |  |  |  |  |  |  |  |  |  |  |  |  |  |  |
| N | 0.02 | 0.02 | 0.02 |  | 0.12 | 0.02 |  | 0.02 |  | 0.4 |  | 0.02 |  | 0.02 |
| ⋮ |  |  |  |  |  |  |  |  |  |  |  |  |  |  |
| T | 0.02 | 0.02 | 0.02 |  | 0.02 | 0.12 |  | 0.02 |  | 0.02 |  | 0.4 |  | 0.02 |
| ⋮ |  |  |  |  |  |  |  |  |  |  |  |  |  |  |
| Z | 0.02 | 0.02 | 0.02 |  | 0.02 | 0.02 |  | 0.02 |  | 0.02 |  | 0.02 |  | 0.5 |

WRITTEN ACTUALLY CHARACTER

F I G. 11

| | |
|---|---|
| $K_1 (W_{11})$ | #STAL |
| $K_2 (W_{12})$ | S#TAL |
| $K_3 (W_{13})$ | SI#AL |
| $K_4 (W_{14})$ | SIS#L |
| $K_5 (W_{15})$ | SIST# |
| $K_6 (W_{21})$ | PETAR |
| $K_7 (W_{31})$ | *STAL |
| $K_8 (W_{32})$ | S*TAL |
| $K_9 (W_{33})$ | ST*AL |
| $K_{10} (W_{34})$ | STA*L |
| $K_{11} (W_{35})$ | STAL* |
F I G. 19
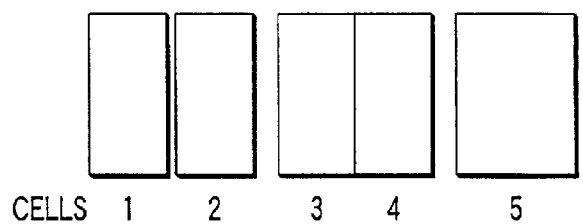
F I G. 20
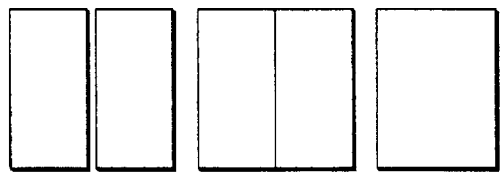
F I G. 21A
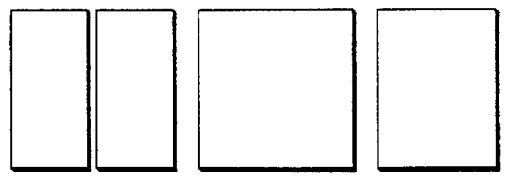
F I G. 21B
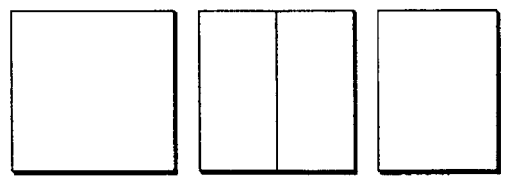
F I G. 21C
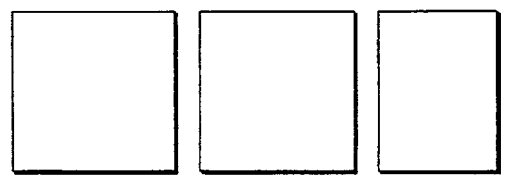
F I G. 21D

WORD RECOGNITION METHOD AND STORAGE MEDIUM THAT STORES WORD RECOGNITION PROGRAM

CROSS-REFERENCE TO RELATED APPLICATIONS

This application is based upon and claims the benefit of priority from the prior Japanese Patent Application No. 2000-020300, filed Jan. 28, 2000, the entire contents of which are incorporated herein by reference.

BACKGROUND OF THE INVENTION

The present invention relates to a word recognition method for performing word recognition in an optical character reader for optically reading a word that consists of a plurality of characters described on a material targeted for reading. In addition, the present invention relates to a storage medium that stores a word recognition program for causing the word recognition processing.

In general, in an optical character reader, for example, in the case where characters described on a material targeted for reading is read, even if individual character recognition precision is low, one can read such characters precisely by using knowledge of words. Conventionally, a variety of methods have been proposed.

For example, in the invention disclosed in Jpn. Pat. Appln. KOKAI Publication No. 10-177624, a distance (the smaller value of the distance is, the more reliable recognition result is.) is used as a result of character recognition, and an evaluation value of words is obtained by summation of these distances.

In addition, in the invention disclosed in Jpn. Pat. Appln. KOKAI Publication No. 8-167008, candidates of words are narrowed at the stage of character recognition, correlation between each of such narrowed candidates and each word is performed, and an evaluation value of words is obtained with the number of coincident characters.

Further, in disclosure of Japanese Electronics & Communications Society Paper Vol., 52-C, No. 6, June 1969, pages 305 to 312, a posteriori probability is used as an evaluation value of words.

The posteriori probability will be described here.

A probability at which an event (b) occurs is expressed as P (b).

A probability at which an event (b) occurs after an event (a) has occurs is expressed as P (b j a).

A case in which the event (b) occurs irrespective of whether or not the event (a) occurs, P (b|a) is the same as P (b). In contrast, a probability at which the event (b) occurs under the influence of the event (a) after the event (a) has occurred is referred to as posteriori probability, and is expressed as P (b|a).

However, any of these conventional methods is meaningful only when the number of characters in a word is constant. If the number of characters is not constant, these methods cannot be used. Even if they are used, a failure will occur. That is, in the invention disclosed in Jpn. Pat. Appln. KOKAI Publication No. 10-177624, the smaller number of characters is, the smaller evaluation value is. Thus, a word with less characters is prone to be selected.

In addition, in the invention disclosed in Jpn. Pat. Appln. KOKAI Publication No. 8-167008 and in the disclosure of Japanese Electronics & Communications Society paper, it is presumed that the number of characters is constant. When the number of characters is not constant, they cannot be used.

Further, a conventional evaluation function for word recognition fails to consider the ambiguity of word delimiting, the absence of character spacing, noise entry, and the ambiguity of character delimiting.

BRIEF SUMMARY OF THE INVENTION

It is an object of the present invention to provide a word recognition method and storage medium that stores a word recognition program, capable of performing word recognition precisely even in the case where the number of characters in a word is not constant.

It is another object of the present invention to provide a word recognition method and storage medium that stores a word recognition program, capable of performing word recognition precisely even in the case where word delimiting is not reliable.

It is still another object of the present invention to provide a word recognition method and storage medium that stores a word recognition program, capable of performing word recognition precisely even in the case where no character spacing is provided or noise entry occurs.

It is a further object of the present invention to provide a word recognition method and storage medium that stores a word recognition program, capable of performing word recognition precisely even in the case where character delimiting is not reliable.

A word recognition method according to the present invention comprises: a character recognition processing step of performing recognition processing of an input character string that corresponds to a word to be recognized by each character to obtain a result of character recognition; a probability calculation step of conditioning characters of words in a word dictionary that stores in advance candidates of words to be recognized, and then, obtaining a probability at which there appear characteristics obtained as a result of character recognition in accordance with the character recognition processing step; a first computation step of performing a predetermined first computation between a probability obtained in accordance with this probability calculation step and a probability at which there appear the characteristics obtained as the result of character recognition in accordance with the character recognition processing step; a second computation step of performing a predetermined second computation between the computation results obtained by the first computation for characters of words contained in the word dictionary; and a word recognition processing step of obtaining the recognition results of the words based on the second computation result obtained by this second computation step.

In addition, the word recognition method according to the present invention comprises: a delimiting step of isolating an input character string that corresponds to a word to be recognized by each character; a step of obtaining plural kinds of delimiting results considering whether or not character spacing is provided; a character recognition processing step of performing recognition processing for characters relevant to all the delimiting results obtained in accordance with this step; a probability calculation step of conditioning characters of words contained in a word dictionary that stores in advance candidates of words to be recognized, and then, obtaining a probability at which there appear characteristics obtained as a result of character recognition in accordance with the character recognition processing step; a first computation step of performing a predetermined first computation between a probability obtained in accordance with the probability calculation step and a probability at which there appear the characteristics obtained as the result of character recognition in accordance with the character recognition processing step; a second computation step of performing a predetermined second computation between computation results obtained by the first computation relevant to characters of words contained in the word dictionary; and a word recognition processing step of obtaining the recognition results of the words based on the result of the second computation in accordance with the second computation step.

In addition, a storage medium according to the present invention is a computer readable storage medium that stores a word recognition program for causing a computer to perform word recognition processing, the word recognition program comprising: a character recognition processing step of performing recognition processing of an input character string that corresponds to a word to be recognized by each character; a probability calculation step of conditioning characters of words contained in a word dictionary that stores in advance candidates of words to be recognized, and then, obtaining a probability at which there appear the characteristics obtained as a result of character recognition in accordance with the character recognition processing step; a first computation step of performing a predetermined first computation between a probability obtained in accordance with this probability calculation step and a probability that there appear the characteristics obtained as the result of character recognition in accordance with the character recognition processing step; a second computation step of performing a predetermined second computation between the computation results obtained by the first computation for characters of words contained in the word dictionary; and a word recognition processing step of obtaining the recognition results of the words based on the second computation result obtained by this second computation step.

According to the present invention, in word recognition using the character recognition result, an evaluation function is used based on a posteriori probability that can be used even in the case where the number of characters in a word is not always constant. In this way, even in the case where the number of characters in a word is not constant, word recognition can be performed precisely.

In addition, according to the present invention, in word recognition using the character recognition result, an evaluation function is used based on a posteriori probability considering at least the ambiguity of word delimiting. In this way, even if the word delimiting is not reliable, word recognition can be performed precisely.

In addition, according to the present invention, in word recognition using the character recognition result, an evaluation function is used based on a posteriori probability considering at least the fact that no character spacing is provided. In this way, even in the case where no character spacing is provided, word recognition can be performed precisely.

In addition, according to the present invention, in word recognition using the character recognition result, an evaluation function is used based on a posteriori probability considering at least noise entry. In this way, even if noise entry occurs, word recognition can be performed precisely.

Further, according to the present invention, in word recognition using the character recognition result, an evaluation function is used based on a posteriori probability considering at least the ambiguity of character delimiting. In this way, even if character delimiting is not reliable, word recognition can be performed precisely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flow chart illustrating an outline of the word recognition method;

FIG. 4 is a view showing a character pattern identified as a city name;

FIG. 5 is a view showing the contents of a word dictionary;

FIG. 6 and FIG. 7 are views showing the contents of a probability table;

FIG. 11 is a view showing the contents of a probability table;

FIG. 19 is a view showing a set of categories relevant to the word dictionary shown in FIG. 18;

FIG. 20 is a view showing cells processed as representing a city name;

FIG. 21A to FIG. 21D are views showing a character delimiting pattern candidate;

DETAILED DESCRIPTION OF THE INVENTION

Hereinafter, preferred embodiments of the present invention will be described with reference to the accompanying drawings.

Figure 1:
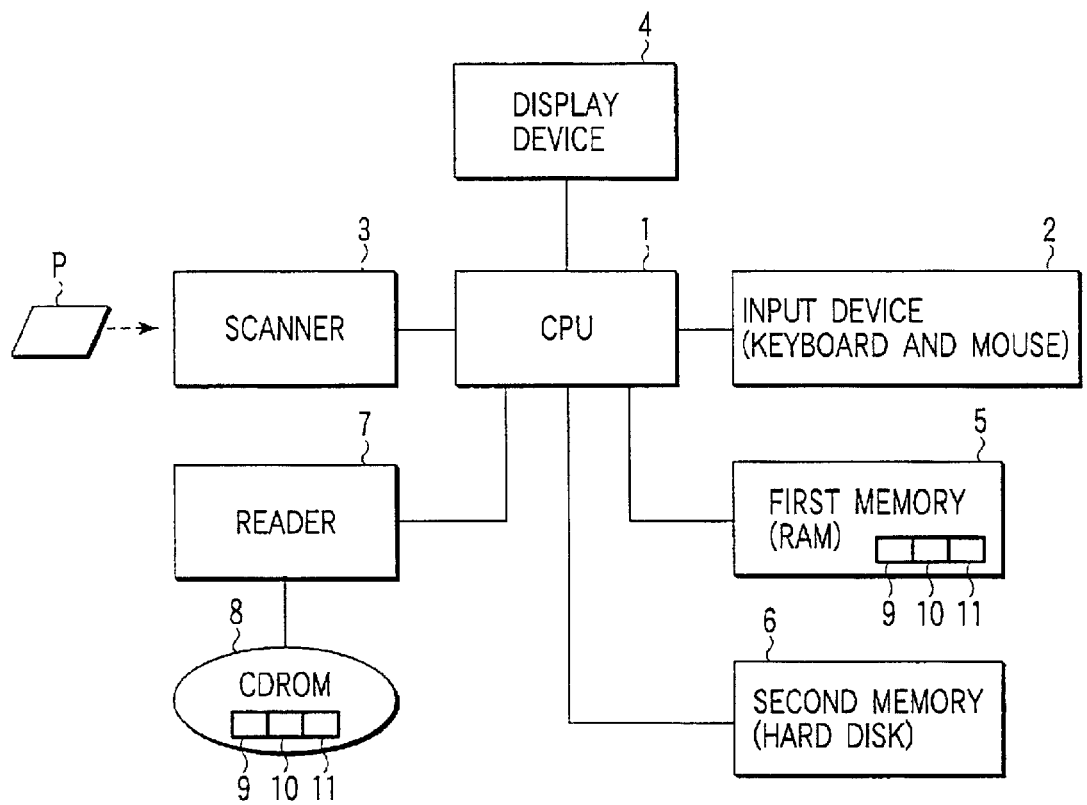
FIG. 1 is a block diagram schematically depicting a configuration of a word recognition system for achieving a word recognition method according to an embodiment of the present invention.

FIG. 1 schematically depicts a configuration of a word recognition system for achieving a word recognition method according to an embodiment of the present invention.

In FIG. 1, this word recognition system is composed of: a CPU (central processing unit) 1; an input device 2; a scanner 3 that is image input means; a display device 4; a first memory 5 that is storage means; a second memory 6 that is storage means; and a reader 7.

The CPU 1 executes an operating system program stored in the second memory 6 and an application program (word recognition program or the like) stored in the second memory 6, thereby performing word recognition processing as described later in detail.

The input device 2 consists of a keyboard and a mouse, for example, and is used for a user to perform a variety of operations or input a variety of data.

Figure 2:
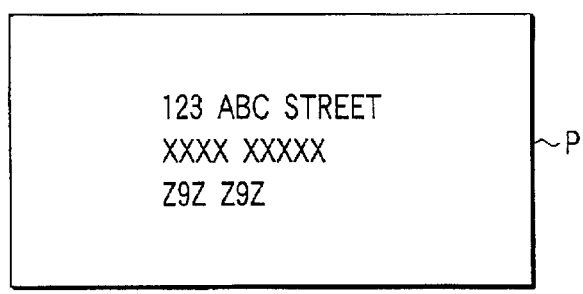
FIG. 2 is a view showing a description example of a mail on which an address is described.

The scanner 3 reads characters of a word described on a material targeted for reading through scanning, and inputs these characters. The above material targeted for reading includes a mail P on which an address is described, for example. In a method of describing the above address, as shown in FIG. 2, postal number, name of state, city name, street name, and street number are described in order from the lowest line and from the right side.

The display device 4 consists of a display unit and a printer, for example, and outputs a variety of data.

The first memory 5 is composed of a RAM (random access memory), for example. This memory is used as a work memory of the CPU 1, and temporarily stores a variety of data or the like being processed.

The second memory 6 is composed of a hard disk unit, for example, and stores a variety of programs or the like for operating the CPU 1. The second memory 6 stores: an operating system program for operating the input device 2, scanner 3, display device 4, first memory 5, and reader 7; a word recognition program and a character dictionary 9 for recognizing characters that configure a word; a word dictionary 10 for word recognition; and a probability table 11 that stores a probability of the generation of characters that configure a word or the like. The above word dictionary 10 stores in advance a plurality of candidates of words to be recognized. This dictionary can be used as a city name dictionary that registers regions in which word recognition systems are installed, for example, city names in states.

The reader 7 consists of a CD-ROM drive unit or the like, for example, and reads a word recognition program stored in a CD-ROM 8 that is a storage medium and a word dictionary 10 for word recognition. The word recognition program, character dictionary 9, word dictionary 10, and probability table 1 read by the reader 7 are stored in the second memory 6.

Now, an outline of a word recognition method will be described with reference to a flow chart shown in FIG. 3.

First, image acquisition processing for acquiring (reading) an image of a mail P is performed by means of the scanner 3 (ST1). Region detection processing for detecting a region in which an address is described is performed by using the image acquired by the image acquisition processing (ST2). There is performed delimiting processing for using vertical projection or horizontal projection, thereby identifying a character pattern in a rectangular region for each character of a word that corresponds to a city name, from a description region of the address detected by the region detection processing (ST3). Character recognition processing for acquiring a character recognition candidate is performed based on a degree of analogy obtained by comparing a character pattern of each character of the word identified by this delimiting processing with a character pattern stored in the character dictionary 9 (ST4). By using the recognition result of each character of the word obtained by this character recognition processing; each of characters of the city names stored in the word dictionary 10; and the probability table 11, the posteriori probability is calculated by each city name contained in the word dictionary 10, and there is performed word recognition processing in which a word with its highest posteriori probability is recognized (ST5). Each of the above processing functions is controlled by means of the CPU 1.

When character pattern delimiting processing is performed in accordance with the step 3, a word break may be judged based on a character pattern for each character and a gap in size between the patterned characters. In addition, it may be judged whether or not character spacing is provided based on the gap in size.

A word recognition method according to an embodiment of the present invention is achieved in such a system configuration. Now, an outline of the word recognition method will be described below.

1. Outline

For example, consider character reading by an optical character reader. Although no problem will occur when the character reader has high character reading performance, and hardly makes a mistake, for example, it is difficult to achieve such high performance in recognition of a hand-written character. Thus, recognition precision is enhanced by using knowledge of words. Specifically, a word that is believed to be correct is selected from a word dictionary. Because of this, a certain evaluation value is calculated for each word, and a word with its highest (lowest) evaluation value is obtained as a recognition result. Although a variety of evaluation functions as described previously are proposed, a variety of problems as described previously still remain unsolved.

In the present embodiment, a posteriori probability considering a variety of problems as described previously is used as an evaluation function. In this way, all data concerning a difference in the number of characters, the ambiguity of word delimiting, the absence of character spacing, noise entry, and character break can be naturally incorporated in one evaluation function by calculation of probability.

Now, a general theory of Bayes Estimation used in the present invention will be described below.

2. General Theory OF Bayes Estimation

An input pattern (input character string) is defined as "x". In recognition processing, certain processing is performed for "x", and the classification result is obtained. This processing can be roughly divided into the two processes below.

(1) "Characteristic r (=R (x)) is obtained by multiplying characteristics extraction processing R for obtaining any characteristic quantity relevant to "x".

(2) The classification result "ki" is obtained by using any evaluation method relevant to the characteristic "r".

The classification result "ki" corresponds to the "recognition result". In word recognition, note that the "recognition result" of character recognition is used as one of the characteristics. Hereinafter, the terms "characteristics" and "recognition result" are used distinctly.

The Bayes Estimation is used as an evaluation method in the second process. A category "ki" with its highest posteriori probability P (ki|r) is obtained as a result of recognition. In the case where it is difficult or impossible to directly calculate the posteriori probability P (ki|r), the probability is calculated indirectly by using Bayes Estimation Theory, i.e., the following formula $$P(k_i|r) = \frac{P(r|k_i)P(k_i)}{P(r)} \quad (1)$$

A denominator P (r) is a constant that does not depend on "i". Thus, a numerator P (p|ki) P (ki) is calculated, whereby a magnitude of the posteriori probability P (ki|r) can be evaluated.

Now, for a better understanding of the following description, a description will be given to the Bayes Estimation in word recognition when the number of characters is constant. In this case, the Bayes Estimation is effective in English or any other language in which a word break may occur.

3. Bayes Estimation when the Number of Characters is Constant 3.1 Definition of Formula This section assumes that character and word delimitings are completely successful, and the number of characters is fixedly determined without noise entry between characters. The following formulas are defined.

Number of characters L

Category set K={$k_i$}

$k_i=\hat{w}_i$, $\hat{w}_i \in \hat{w}$, $\hat{w}$: Set of words with the number of characters L $\hat{w}_i=(\hat{w}_{i1}, \hat{w}_{i2}, \ldots, \hat{w}_{iL})$ $\hat{w}_{ij}$: j-th character of $\hat{w}i$ $\hat{w}_{ij} \in C$, C: Character Set Characteristics r=($r_1, r_2, r_3, \ldots, r_L$)

$r_i$: Character characteristics of i-th character (=character recognition result)

(Example: first candidate, first to third candidates, candidates having a predetermined similarity, first and second candidates and its similarity or the like)

In the foregoing description, "wa" may be expressed in place of "$\hat{w}_i$".

At this time, assume that a written word is estimated based on the Bayes Estimation.

$$P(k_i|r) = \frac{P(r|k_i)P(k_i)}{P(r)} \quad (2)$$

P (r|ki) is represented as follows.

$$P(r|k_i) = P(r_1|\hat{w}_{i1})P(r_2|\hat{w}_{i2}) \ldots P(r_L|\hat{w}_{iL}) = \prod_{i=1}^{L} P(rj|\hat{w}_{ij}) \quad (3)$$

Assume that P (ki) is statistically obtained in advance. For example, reading an address of a mail is considered as depending on a position in a letter or a position in line as well as statistics of address.

Although P (r|ki) is represented as a product, this product can be converted into addition by using an algorithm, for example, without being limited thereto. This fact applies to the following description.

3.2 Approximation for Practical Use

A significant difference in performance of recognition may occur depending on what is used as a characteristic "ri".

3.2.1 When a First Candidate is Used

Consider that a "character specified as a first candidate" is used as a character characteristic "ri". This character is defined as follows.

Character set C={ci}

Example) ci: Numeral ci: Alphabetical upper-case or lower-case letter

Character characteristic set E={ei} ei=(the first candidate is "ci")

ri∈E

For example, assume that "alphabetical upper-case and lower-case letters+numerals" is a character set C. The types of characteristics "ei" and types of characters "ci" have n (C)=n (E)=62 ways. Thus, there are $62^2$ combinations of (ei, cj). 622 ways of P (ei|cj) are provided in advance, whereby the above formula 3 is used for calculation. Specifically, for example, in order to obtain P (ei|"A"), many samples of "A" are supplied to characteristics extraction processing R, and the frequency of the generation of each characteristic "ei" may be checked.

3.2.2 Approximation

Here, the following approximations may be used.

$$\forall_i, (e_i|c_i)=P \quad (4)$$

$$\forall_i \neq \forall j, p(e_i|c_i)=q \quad (5)$$

The above formulas 4 and 5 are approximations in which, in any character "ci", a probability at which a first candidate is the characters themselves is equally "p", and a probability at which the first candidate is the other characters is equally "q". At this time, the following result is obtained.

$$p+\{n(E)-1\}q=1 \quad (6)$$

This approximation assumes that a character string listing the first candidates is a result of preliminary recognition. This result corresponds to matching for checking how many words such character string coincides with each word "wa". When the characters with "a" in number are coincident with each other, the following simple result is obtained.

$$P(r|\hat{w}_i)=p^a q^{L-a} \quad (7)$$

3.3 Specific Example

For example, consider that a city name is read in address reading of mail P written in English as shown in FIG. 2. FIG. 4 shows the delimiting processing result of a character pattern that corresponds to a portion at which it is believed that the city name identified by the above mentioned delimiting processing is written. This result shows that four characters are detected. A word dictionary 10 stores candidates of city names (words) by the number of characters. For example, a candidate of a city name (word) that consists of four characters is shown in FIG. 5. In this case, five city names each consisting of four characters are stored as MAIR (k1), SORD (k2), ABLA (k3), HAMA (k4), and HEWN (k5).

Character recognition is performed for each character pattern shown in FIG. 4 by the above described character recognition processing. A posteriori probability for each of the city names shown in FIG. 5 is calculated on the basis of the character recognition result of such each character pattern.

Although characteristics (=character recognition results) used for calculation are various, an example using characters of a first candidate is shown here. In this case, the character recognition result is "H, A, I, A" in order from the left-most character, relevant to each character pattern shown in FIG. 4. In this way, from the above formula 3, a probability P (r|k1) the probability that the character recognition result "H, A, I, A" shown in FIG. 4 will be produced when the actually written character is "MAIR (k1)", $$P(r|k_1)=P(\text{``}H\text{''}|\text{``}M\text{''})P(\text{``}A\text{''}|\text{``}A\text{''})P(\text{``}I\text{''}|\text{``}I\text{''})P(\text{``}A\text{''}|\text{``}R\text{''}) \qquad (8)$$

As described in subsection 3.2.1, the value of each term on the right side is obtained in advance by preparing a probability table. Alternatively, by using approximation described in subsection 3.2.2, namely, for example, when p=0.5 and n (E)=26, q=0.02. Thus, the calculation result is obtained as follows.

$$P(r|k1)=q\cdot p\cdot p\cdot q=0.0001 \qquad (9)$$

That is, a probability P (r|k1) at which the city name MAIR (ki) relevant to the character recognition result "H, A, I, A" is the result of word recognition is 0.0001.

Similarly, the following results are obtained.

$$P(r|k2)=q\cdot q\cdot q\cdot q=0.00000016$$

$$P(r|k3)=q\cdot q\cdot q\cdot p=0.000004$$

$$P(r|k4)=p\cdot p\cdot q\cdot p=0.0025$$

$$P(r|k5)=p\cdot q\cdot q\cdot q=0.000004 \qquad (10)$$

The probability P (r|K2) that the character recognition result "H, A, I, A" shown in FIG. 4 will be produced when the actually written character is "SORD (k2)", is 0.00000016.

The probability P (r|K3) that the character recognition result "H, A, I, A" shown in FIG. 4 will be produced when the actually written character is "SORD (k3)", is 0.000004.

The probability P (r|K4) that the character recognition result "H, A, I, A" shown in FIG. 4 will be produced when the actually written character is "SORD (k4)", is 0.0025.

The probability P (r|K5) that the character recognition result "H, A, I, A" shown in FIG. 4 will be produced when the actually written character is "SORD (k5)", is 0.000004.

Assuming that P (k1) to P (k5) are equal to each other, the magnitude of a posteriori probability P (ki|r) is equal to P (r|ki) from the above formula 2. Therefore, the formulas 9 and 10 may be compared with each other in magnitude. The largest probability is P (r|k4), and thus, the city name written in FIG. 2 is estimated as HAMA. A description will now be given of the probability table 11. FIG. 6 shows how the approximation described in section 3.2.2 is expressed in the form of a probability table. The characters are assumed to be 26 upper-case alphabetic characters. In FIG. 6, the vertical axis indicates actually written characters, while the horizontal axis represents their character recognition results. For example, the intersection between vertical line "M" and horizontal line "H" in the probability table 11 represents the probability P("H"|"M"), at which the character recognition result becomes "H" when the actually written character is "M." In the approximation described in section 3.2.2., the probability of each character recognition result correctly representing the actually written character is assumed to be "p". This being so, the diagonal line between the upper left corner of the probability table 11 and the lower right corner thereof is constant. In the case of FIG. 6, the probability is 0.5. Likewise, in the approximation described in section 3.2.2., the probability of each character recognition result representing a character other than the actually written character is assumed to be "q". This being so, the diagonal line between the upper left corner of the probability table 11 and the lower right corner thereof is constant. In the case of FIG. 6, the probability is 0.02.

As a result of using approximation described in subsection 3.2.2, a city name with its more coincident characters among city names contained in the word dictionary 10 shown in FIG. 5 and among the city names obtained by the character recognition shown in FIG. 4, is selected. Without using approximation described in subsection 3.2.2, as described in subsection 3.2.1, in the case where each P (ei|cj) is obtained in advance, and then, the obtained value is used for calculation, a city name with its more coincident characters is not always selected.

For example, a comparatively large value is in the first term of the above formula 8 because H and M is similar to each other in shape. Thus, the following result is obtained.

$$P(\text{``}M\text{''}|\text{``}M\text{''})=0.32, P(\text{``}H\text{''}|\text{``}M\text{''})=0.2,$$

$$P(\text{``}H\text{''}|\text{``}H\text{''})=0.32, P(\text{``}M\text{''}|\text{``}H\text{''})=0.2,$$

Similarly, a value in the fourth term is obtained in accordance with the following formulas $$P(\text{``}R\text{''}|\text{``}R\text{''})=0.42, P(\text{``}A\text{''}|\text{``}A\text{''}|\text{``}R\text{''})=0.1,$$

$$P(\text{``}A\text{''}|\text{``}A\text{''}|\text{``}A\text{''})=0.42, P(\text{``}R\text{''}|\text{``}A\text{''})=0.1$$

With respect to the other characters, approximation described in subsection 3.2.2 can be used. The probability table 11 in this case is shown in FIG. 7. At this time, the following result is obtained.

$$P(r|k_1)=P(\text{``}H\text{''}|\text{``}M\text{''})\cdot p(\text{``}A\text{''}|\text{``}A\text{''})\cdot p\cdot P(\text{``}A\text{''}|\text{``}R\text{''})=0.0042$$

$$P(r|k_2)=q\cdot q\cdot q\cdot q=0.00000016$$

$$P(r|k_3)=q\cdot q\cdot q\cdot P(\text{``}A\text{''}|\text{``}A\text{''})=0.00000336$$

$$P(r|k_4)=P(\text{``}H\text{''}|\text{``}H\text{''})\cdot P(\text{``}A\text{''}|\text{``}A\text{''})\cdot q\cdot P(\text{``}A\text{''}|\text{``}A\text{''})\approx 0.0011$$

$$P(r|k_5)=P(\text{``}H\text{''}|\text{``}H\text{''})\cdot q\cdot q\cdot q=0.00000256 \qquad (11)$$

In this formula, P (r|k1) includes the largest value, and a city name estimated to be written on a mail P shown in FIG. 2 is MAIR.

Now, a description is given to the Bayes

Estimation in word recognition when the number of characters is not constant according to the first embodiment of the present invention. In this case, the Bayes Estimation is effective in Japanese or any other language in which no word break occurs. In addition, in a language in which a word break occurs, the Bays Estimation is effective in the case where a word dictionary contains a character string consisting of a plurality of words.

4. Bayes Estimation when the Number of Characters is not Constant

In reality, although there is a case in which a character string of a plurality of words is contained in a category (for example, NORTH YORK), a character string of one word cannot be compared with a character string of two words in the method described in chapter 3. In addition, the number of characters is not constant in a language (such as Japanese)

in which no word break occurs, the method described in chapter 3 is not used. Now, this section describes a word recognition method that corresponds to a case in which the number of characters is not always constant.

4.1 Definition of Formulas

An input pattern "x" is defined as a plurality of words rather than one word, and Bayes Estimation is performed in a similar manner to that described in chapter 3. In this case, the definitions in chapter 3 are added and changed as follows.

Changes:

An input pattern "x" is defined as a plurality of words.

L: Total number of characters in the input pattern "x"

Category set K={ki}

$k_i=(\hat{w}'_j, h)$ $\hat{w}'_j \in \hat{w}'$, $\hat{w}'$: A set of character strings having the number of characters and the number of words that can be applied to input "x"

h: A position of a character string "$\hat{w}_j$" in the input "x". A character string "$\hat{w}'_j$" starts from (h+1)-th character from the start of the input "x".

In the foregoing description, wb may be expressed in place of $\hat{w}_j$.

Additions:

$\hat{w}'_j=(\hat{w}_{j1}, \hat{w}'_{j2}, \ldots, \hat{w}_{jL_j})$ $L_j$: Total number of characters in character string "$\hat{w}'^5$"

$\hat{w}'_{jk}$: k-th character of $\hat{w}'j$ $\hat{w}'_{jk} \in C$

At this time, when Bayes Estimation is used, a posteriori probability P (ki|r) is equal to that obtained by the above formula 2.

$$P(k_i|r) = \frac{P(r|k_i)P(k_i)}{P(r)} \quad (12)$$

P (r|ki) is represented as follows.

$$P(r|k_i) = P(r_1, r_2, \ldots, r_h|k_i) \cdot \quad (13)$$

$$P(r_{h+1}|\hat{w}'_{j1})P(r_{h+2}|\hat{w}'_{j2}) \ldots P(r_{h+L_j}|\hat{w}'_{jL_j}) \cdot$$

$$P(r_{h+L_j+1}, r_{h+L_j+2}, \ldots, r_L|k_i)$$

$$= P(r_1, r_2, \ldots, r_h|k_i) \left\{ \prod_{k=1}^{L_j} P(r_{h+k}|\hat{w}'_{jk}) \right\} \cdot$$

$$P(r_{h+L_j+1}, r_{h+L_j+2}, \ldots, r_L|k_i)$$

Assume that P (ki) is obtained in the same way as that described in chapter 3. Note that n (K) increases more significantly than that in chapter 3, and thus, a value of P (ki) is simply smaller than that in chapter 3.

4.2 Approximation for Practical Use 4.2.1 Approximation Relevant to a Portion Free of any Character String and Normalization of the Number of Characters The first term of the above formula 13 is approximated as follows.

$$P(r_1, r_2, \ldots, r_h|k_i) \approx P(r_1, r_2, \ldots, r_h) \quad (14)$$

$$\approx P(r_1)P(r_2) \ldots P(r_h)$$

Approximation of a first line assumes that there is ignored an effect of "wb" on a portion to which a character string "wb" of all the characters of the input pattern "x" is applied. Approximation of a second line assumes that each "rk" is independent". This is not really true. These approximation is coarse, but is very effective.

Similarly, when the third term of the above formula 13 is approximated, the formula 13 is changed as follows.

$$P(r|k_i) = \prod_{k=1}^{L_j} P(r_{h+k}|\hat{w}'_{jk}) \prod_{\substack{1 <= k <= h \\ h+L_j+1 <= k <= L}} P(r_k) \quad (15)$$

Here, assume a value of P (ki|r)/P (ki). This value indicates how a probability of "ki" increases or decreases by knowing a characteristic "r".

$$\frac{P(k_i|r)}{P(k_i)} = \frac{P(r|k_i)}{P(r)} \quad (16)$$

$$\approx \frac{\prod_{k=1}^{L_j} P(r_{h+k}|\hat{w}'_{jk}) \prod_{\substack{1 <= k <= h \\ h+L_j+1 <= k <= L}} P(r_k)}{\prod_{k=1}^{L} P(r_k)}$$

$$= \prod_{k=1}^{L_j} \frac{P(r_{h+k}|\hat{w}'_{jk})}{P(r_{h+k})}$$

Approximation using a denominator in line 2 of the formula 16 is similar to that obtained by the above formula 14.

This result is very important. At the right side of the above formula 16, there is no description concerning a portion at which the character string "wb" of all the characters is not applied. That is, the above formula 16 is not associated with what the input pattern Axe is. From this fact, it is found that P (ki|r) can be calculated by using the above formula 16 without worrying about the position and length of the character string "wb", and multiplying P (ki).

A numerator of the above formula 16 is the same as that of the above formula 3, namely, P (r|ki) when the number of characters is constant. This means that the above formula 16 performs normalization of the number of characters by using the denominator.

4.2.2 When a First Candidate is Used

Here, assume that characters specified as a first candidate is used as a characteristic as described in subsection 3.2.1. The following approximation of P (rk) is assumed.

$$P(r_k) = \frac{1}{n(E)} \quad (17)$$

In reality, although there is a need to consider the probability of generation of each character, this consideration is ignored here. At this time, when the above formula 16 is approximated by using the approximation described in subsection 3.2.2, the following result is obtained.

$$\frac{P(k_i|r)}{P(k_i)} = p^a q^{L_j-a} n(E)^{L_j} \quad (18)$$

where normalization is effected by n $(E)^{L_j}$.

4.3 Specific Example

For example, consider that a city name is read in mail address reading when:

there exists a city name consisting of a plurality of words in a language (such as English) in which a work break occurs; and when a city name is written in a language (such as Japanese) in which no word break occurs.

Figure 8:
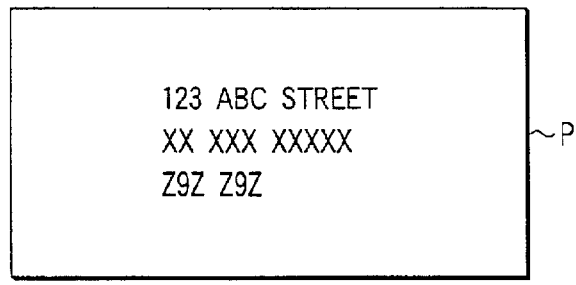
FIG. 8 is a view showing a description example of a mail on which an address is described.
Figure 9:
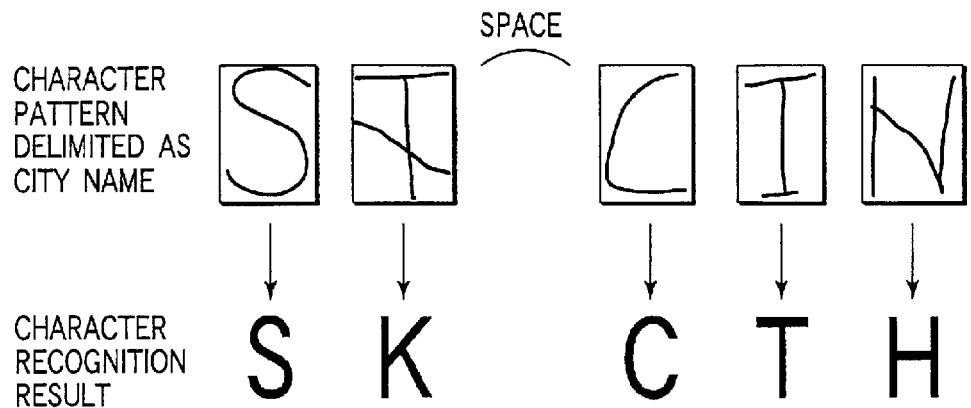
FIG. 9 is a view showing a character pattern identified as a city name.
Figure 10:
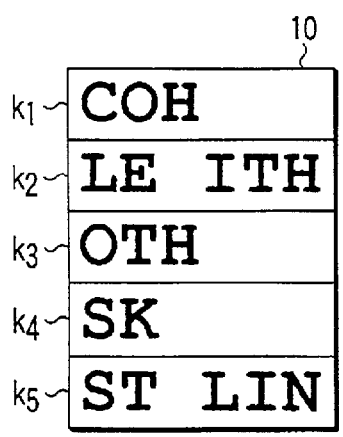
FIG. 10 is a view showing the contents of a word dictionary.

In the foregoing, the number of characters of each candidate is not constant. For example, consider that a city name is read in address reading of mail P written in English as shown in FIG. 8. FIG. 9 shows the delimiting processing result of a character pattern that corresponds to a portion at which it is believed that the city name identified by the above described delimiting processing is written, wherein it is detected that a word consisting of two characters is followed by a space, and such space is followed by a word consisting of three characters. The word dictionary 10, as shown in FIG. 10, stores all the city names having the number of characters or the number of words applied in FIG. 9. In this case, five city names are stored as COH (k1), LE ITH (k2), OTH (k3), SK (k4), and STLIN (k5).

Character recognition is performed for each character patterns shown in FIG. 9 by the above described character recognition processing. The posteriori probability is calculated by each city name shown in FIG. 10 on the basis of the character recognition result obtained by such each character pattern.

Although characteristics used for calculation (=character recognition results) are various, an example using characters specified as a first candidate is shown here. In this case, the character recognition result is S, K, C, T, H in order from the left-most character relevant to each character pattern shown in FIG. 9. When approximation described in subsection 4.2.1 is used, in accordance with the above formula 16, a posteriori probability P (ki|r). That the last three characters are "COH" when the character recognition result is "S, K, C, T, H".

$$\frac{P(k_1|r)}{P(k_1)} \approx \frac{P(\text{``}C\text{''}|\text{``}C\text{''})}{P(\text{``}C\text{''})} \frac{P(\text{``}T\text{''}|\text{``}O\text{''})}{P(\text{``}T\text{''})} \frac{P(\text{``}H\text{''}|\text{``}H\text{''})}{P(\text{``}H\text{''})} \quad (19)$$

Further, in the case where approximation described in subsections 3.2.2 and 4.2.2 is used, when p=0.5 and n (E)=26, q=0.02. Thus, the following result is obtained.

$$\frac{P(k_1|r)}{P(k_1)} \approx p \cdot q \cdot p \cdot n(E)^3 = 87.88 \quad (20)$$

Similarly, the following result is obtained.

$$\frac{P(k_2|r)}{P(k_2)} \approx q \cdot q \cdot q \cdot p \cdot p \cdot n(E)^5 \approx 23.76 \quad (21)$$

$$\frac{P(k_3|r)}{P(k_3)} \approx q \cdot p \cdot p \cdot n(E)^3 = 87.88$$

$$\frac{P(k_4|r)}{P(k_4)} \approx p \cdot p \cdot n(E)^2 = 169$$

$$\frac{P(k_5|r)}{P(k_5)} \approx p \cdot q \cdot q \cdot q \cdot q \cdot n(E)^5 \approx 0.95$$

In the above formula, "k3" assumes that the right three characters are OTH, and "k4", assumes that the left two characters are SK.

Assuming that P (ki) to P (k5) are equal to each other, with respect to the magnitude of the posteriori probability P (ki|r), the above formulas 21 and 22 may be compared with each other in magnitude. The highest probability is P (k|r), and thus, the city name written in FIG. 8 is estimated as SK.

Without using approximation described in subsection 3.2.2, as described in subsection 3.2.1, there is shown an example when each P (ei|cj) is obtained in advance, and then, the obtained value is used for calculation.

Because the shapes of C and L, T and I, and H and N are similar to each other, it is assumed that the following result is obtained.

$$P(\text{``}C\text{''}|\text{``}C\text{''}) = P(\text{``}L\text{''}|\text{``}L\text{''}) = P(\text{``}T\text{''}|\text{``}T\text{''}) = P(\text{``}I\text{''}|\text{``}I\text{''})$$
$$= P(\text{``}H\text{''}|\text{``}H\text{''}) = P(\text{``}N\text{''}|\text{``}N\text{''}) = 0.4$$
$$P(\text{``}C\text{''}|\text{``}L\text{''}) = P(\text{``}L\text{''}|\text{``}C\text{''}) = P(\text{``}T\text{''}|\text{``}I\text{''}) = P(\text{``}I\text{''}|\text{``}T\text{''})$$
$$= P(\text{``}N\text{''}|\text{``}H\text{''}) = P(\text{``}H\text{''}|\text{``}N\text{''}) = 0.12$$

Approximation described in subsection 3.2.2 is met with respect to the other characters. The probability table 11 in this case is shown in FIG. 11. At this time, the following result is obtained.

$$\frac{P(k_1|r)}{P(k_1)} \approx P(\text{``}C\text{''}|\text{``}C\text{''}) \cdot q \cdot P(\text{``}H\text{''}|\text{``}H\text{''}) \cdot n(E)^3 \approx 56.24 \quad (22)$$

$$\frac{P(k_2|r)}{P(k_2)} \approx q \cdot q \cdot q \cdot P(\text{``}T\text{''}|\text{``}T\text{''}) \cdot P(\text{``}H\text{''}|\text{``}H\text{''}) \cdot n(E)^3 \approx 15.21$$

$$\frac{P(k_3|r)}{P(k_3)} \approx q \cdot P(\text{``}T\text{''}|\text{``}T\text{''}) \cdot P(\text{``}H\text{''}|\text{``}H\text{''}) \cdot n(E)^3 \approx 56.24$$

$$\frac{P(k_4|r)}{P(k_4)} \approx p \cdot p \cdot n(E)^2 \approx 169$$

$$\frac{P(k_5|r)}{P(k_5)} \approx p \cdot q \cdot P(\text{``}C\text{''}|\text{``}L\text{''}) \cdot P(\text{``}T\text{''}|\text{``}I\text{''}) \cdot$$
$$P(\text{``}H\text{''}|\text{``}N\text{''}) \cdot n(E)^5 \approx 205.3$$

In this formula, P (k5|r)/P (k5) includes the largest value, and the city name estimated to be written in FIG. 8 is ST LIN.

In this way, in the first embodiment, recognition processing is performed by each character for an input character string that corresponds to a word to be recognized; there is obtained a probability of the generation of characteristics obtained as the result of character recognition by conditioning characters of the words contained in a word dictionary that stores in advance candidates of words to be recognized; the thus obtained probability is divided by a probability of the generation of characteristics obtained as the result of character recognition; each of the above division results obtained for the characters of the words contained in the word dictionary is divided for all the characters; and the above word recognition result is obtained based on each of such division results.

That is, in word recognition using the character recognition result, even in the case where the number of characters in a word is not constant, word recognition can be performed precisely by using an evaluation function based on a posteriori probability that can be used even in the case where the number of characters in a word is not always constant.

Now, a description will be given to Bayes Estimation according to a second embodiment of the present invention, the Bayes Estimation being characterized in that, when word delimiting is ambiguous, such ambiguity is included in calculation of the posteriori probability. In this case, the Bayes Estimation is effective when error detection of word break cannot be ignored.

5. Integration of Word Delimiting

In a language (such as English) in which a word break occurs, the methods described in the foregoing chapters 1 to 4 assume that a word is always identified correctly. If the number of characters is changed while this assumption is not met, these methods cannot be used. In this chapter, the result of word delimiting is treated as a probability without being defined as absoluteness, whereby the ambiguity of word delimiting is integrated with the Bayes Estimation in word recognition. A primary difference from chapter 4 is that consideration is taken into characteristics between characters obtained as the result of word delimiting.

5.1 Definition of Formulas

This section assumes that character delimiting is completely successful, and no noise entry occurs. The definitions in chapter 4 are added and changed as follows.

Changes

An input pattern "x" is defined as a line.

L: Total number of characters in the input line "x"

Category set K={ki}

$k_i=(\tilde{w}_j, h)$, $\tilde{w}_j \in \tilde{w}$, $\tilde{w}$: A set of all candidates of character strings (The number of characteristics is not limited.)

h: A position of a character string "$\tilde{w}_j$" in an input line "x". A character string $\tilde{w}_j$ starts from (h+1)-th character from the start of an input pattern "x".

In the foregoing description, "wc" may be expressed in place of "$\tilde{w}_j$".

Additions $\tilde{w}_j=(\tilde{w}_{j1}, \tilde{w}_{j2}, \ldots, \tilde{w}'_{jLj}, \tilde{w}'_{j0}, \tilde{w}'_{j1}, \tilde{w}'_{j2}, \ldots, \tilde{w}'_{jLj-1}, \tilde{w}'_{jLj})$ Lj: Number of characters in character string "$\tilde{w}_j$"

$\tilde{w}_{jk}$: k-th character "$\tilde{w}_{jk} \in C$" of character string "$\tilde{w}_j$"

$\tilde{w}'_{jk}$: Whether or not a word break occurs k-th character and (k+1)-th character of character string "$\tilde{w}_j$"

$\tilde{w}'_{jk} \in S$, $S=\{s_0, s_1(, s_2)\}$ $s_0$: Break $s_1$: No break ($s_2$: Start or end of line)

($s_2$ is provided for representing the start or end of line in the same format, and is not essential.)

Change

Characteristic "r"=(rc, rs)

rc: Character characteristics, and rs: Characteristics of character spacing

Addition

Character characteristics $r_C=(r_{C1}, r_{C2}, r_{C3}, \ldots, r_{CL})$ $r_{Ci}$: Character characteristics of i-th character (=character recognition result)

(Example: First candidate; first to third candidates; candidate having predetermined similarity, and first and second candidates and their similarity and the like)

Character spacing characteristics $r_S=(r_{S0}, r_{S1}, r_{S2}, \ldots, r_{SL})$ $r_{Si}$: Characteristics of character spacing between i-th character and (i+1)-th character At this time, the posteriori probability P (ki|r) can be represented by the following formula.

$$P(k_i|r) = P(k_i|r_C, r_S) \quad (23)$$

$$= \frac{P(r_C, r_S|k_i)P(k_i)}{P(r_C, r_S)}$$

$$= \frac{P(r_C|r_S, k_i)P(r_S|k_i)P(k_i)}{P(r_C, r_S)}$$

In this formula, assuming that P (rs|ki) and P (rc|ki) are independent of each other (this means that character characteristics extraction and characteristics of character spacing extraction are independent of each other), P (rc|rs, ki) P (rc|ki). Thus, the above formula 23 is changed as follows.

$$P(k_i|r) = \frac{P(r_C|k_i)P(r_S|k_i)P(k_i)}{P(r_C, r_S)} \quad (24)$$

P (rc|ki) is substantially similar to that obtained by the above formula 13.

$$P(r_C|k_i) = P(r_{C1}, r_{C2}, \ldots, r_{Ch}|k_i) \cdot \quad (25)$$

$$P(r_{Ch+1}|\tilde{w}_{j1})P(r_{Ch+2}|\tilde{w}_{j2}) \ldots P(r_{Ch+Lj}|\tilde{w}_{jLj}) \cdot$$

$$P(r_{Ch+Lj+1}, \ldots, r_{CL}|k_i)$$

$$= P(r_{C1}, r_{C2}, \ldots, r_{Ch}|k_i) \left\{ \prod_{k=1}^{L_j} P(r_{Ch+k}|\tilde{w}_{jk}) \right\} \cdot$$

$$P(r_{Ch+Lj+1}, \ldots, r_{CL}|k_i)$$

P (rs|ki) is represented as follows.

$$P(r_S|k_i) = P(r_{S1}, r_{S2}, \ldots, r_{Sh-1}|k_i) \cdot \quad (26)$$

$$P(r_{Sh}|\tilde{w}'_{j0})P(r_{Sh+1}|\tilde{w}'_{j1}) \ldots P(r_{Sh+Lj}|\tilde{w}'_{jLj}) \cdot$$

$$P(r_{Sh+Lj+1}, \ldots, r_{Sh-1}|k_i)$$

$$= P(r_{S1}, r_{S2}, \ldots, r_{Sh-1}|k_i) \left\{ \prod_{k=o}^{L_j} P(r_{Sh+k}|\tilde{w}'_{jk}) \right\} \cdot$$

$$P(r_{Sh+Lj+1}, \ldots, r_{SL-1}|k_i)$$

Assume that P (ki) is obtained in a manner similar to that described in chapters 1 to 4. However, in general, note that n (K) increases more significantly than that described in chapter 4.

5.2 Approximation for Practical Use 5.2.1 Approximation Relevant to a Portion Free of a Character String and Normalization of the Number of Characters When approximation similar to that described in section 4.2.1 is used, the following result is obtained.

$$P(r_C|k_i) = \prod_{k=1}^{L_j} P(r_{Ch+k}|\tilde{w}_{jk}) \prod_{\substack{1 \leq k \leq h \\ h+L_j+1 \leq k \leq L}} P(r_{Ck}) \quad (27)$$

Similarly, the above formula 26 is approximated as follows.

$$P(r_S|k_i) = \prod_{k=1}^{L_j} P(r_{Sh+k}|\tilde{w}'_{jk}) \prod_{\substack{1 \leq k \leq h-1 \\ h+L_j+1 \leq k \leq L-1}} P(r_{Sk}) \quad (28)$$

When a value of P (ki|r)/P (ki) is considered in a manner similar to that described in subsection 4.2.1, the formula is changed as follows.

$$\frac{P(k_i|r)}{P(k_i)} = \frac{P(r_C|k_i)P(r_S|k_i)}{P(r_C, r_S)} \quad (29)$$

$$\approx \frac{P(r_C|k_i)}{P(r_C)} \frac{P(r_S|k_i)}{P(r_S)}$$

-continued $$= \frac{P(k_i|r_C)}{P(k_i)} \frac{P(k_i|r_S)}{P(k_i)}$$

A first line of the above formula 29 is in accordance with the above formula 24. A second line uses approximation obtained by the following formula.

$$P(r_C, r_S) \neq P(r_C)P(r_S)$$

The above formula 29 shows that a "change caused by knowing 'characteristics' of a probability of 'ki'" can be handled independently according to "rc and "rs". The probability is calculated below.

$$\frac{P(k_i|r_C)}{P(k_i)} = \frac{P(r_C|k_i)}{P(r_C)} \quad (30)$$

$$\approx \frac{\prod_{k=1}^{L_j} P(r_{Ch+k}|\tilde{w}_{jk}) \prod_{\substack{1 \le k \le h \\ h+L_j+1 \le k \le L}} P(r_{Ck})}{\prod_{k=1}^{L} P(r_{Ck})}$$

$$= \prod_{k=1}^{L_j} \frac{P(r_{Ch+k}|\tilde{w}_{jk})}{P(r_{Ch+k})}$$

$$\frac{P(k_i|r_S)}{P(k_i)} = \frac{P(r_S|k_i)}{P(r_S)} \quad (31)$$

$$\approx \frac{\prod_{k=0}^{L_j} P(r_{Sh+k}|\tilde{w}'_{jk}) \prod_{\substack{1 \le k \le h-1 \\ h+L_j+1 \le k \le L-1}} P(r_{Sk})}{\prod_{k=1}^{L} P(r_{Sk})}$$

$$= \prod_{k=0}^{L_j} \frac{P(r_{Sh+k}|\tilde{w}'_{jk})}{P(r_{Sh+k})}$$

Approximation used by a denominator in the second line of each of the above formulas 30 and 31 is similar to that obtained by the above formula 14. In the third line of the formula 31, rs0 and rsL are always at the start and end of the line (d3 shown in an example of the next section 5.2.2), P (rs0=P (rsL)=1.

From the foregoing, the following result is obtained.

$$\frac{P(k_i|r)}{P(k_i)} = \prod_{k=1}^{L_j} \frac{P(r_{Ch+k}|\tilde{w}_{jk})}{P(r_{Ch+k})} \prod_{k=0}^{L_j} \frac{P(r_{Sh+k}|\tilde{w}'_{jk})}{P(r_{Sh+k})} \quad (32)$$

As in the above formula 16, in the above formula 32 as well, there is no description concerning a portion to which a character string "wc" is not applied. That is, in this case as well, "normalization caused by a denominator" can be considered.

5.2.2 Example of Characteristics of Character Spacing "rs"

An example of characteristics are defined as follows.

Characteristics of character spacing set D={d0, d1, d2, (, d3)} d0: Expanded character spacing d1: Condensed character spacing d2: No character spacing (d3: This denotes the start or end of the line, and always denotes a word break.)

rs∈D

At this time, the following result is obtained.

$$P(d_k|s_1) k=0,1,2 \ 1=0,1$$

The above formula is established in advance, whereby the numerator in the second term of the above formula 32 can be obtained by the formula below.

$$P(r_{Sh+k}|\tilde{w}'_{jk})$$

where P (d3|s2)=1.

In addition, the formula set forth below is established in advance, whereby the denominator P (rsk) in the second term of the above formula 32 can be obtained.

$$P(d_k) k=0,1,2$$

5.3 Specific Example

As in subsection 4.3, consider that a city name is read in address reading of a mail in English.

Figure 12:
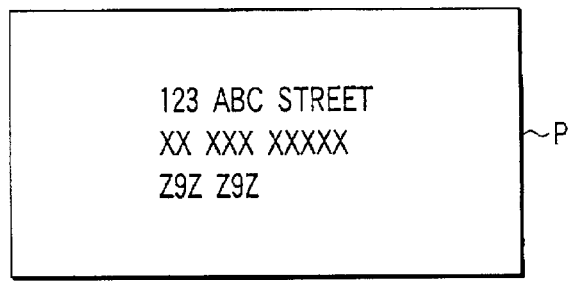
FIG. 12 is a view showing a description example of a mail on which an address is described.
Figure 13:
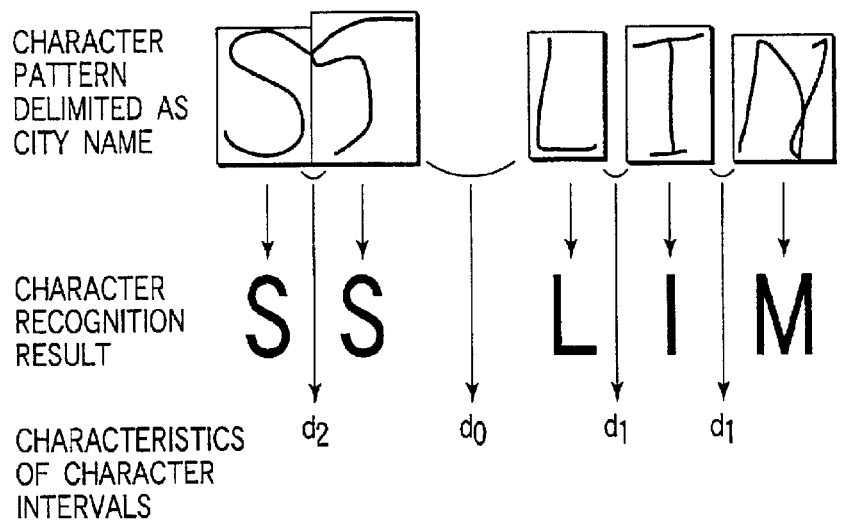
FIG. 13 is a view showing a character pattern identified as a city name.
Figure 14A:
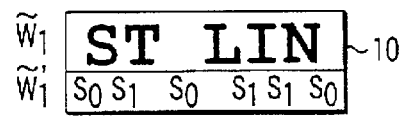
FIG. 14A to FIG. 14C are views showing the contents of a word dictionary.
Figure 14B:
Figure 14C:

For example, consider that a city name is read in address reading of mail P written in English, as shown in FIG. 12. FIG. 13 shows the delimiting processing of a character pattern that corresponds to a portion at which it is believed that the city name identified by the above described delimiting processing is written, wherein a total of five characters are detected. It is detected that the first and second characters are free of being spaced from each other; the second and third characters are expanded in spacing; and the third and fourth characters and the fourth and fifth characters are condensed in spacing. FIG. 14A, FIG. 14B, and FIG. 14C show the contents of the word directory 10, wherein all city names are stored. In this case, three city names are stored as ST LIN shown in FIG. 14A, SLIM shown in FIG. 14B, and SIM shown in FIG. 14C. The sign (s0, s1) described under each city name denotes whether or not a word break occurs. s0 denotes a word break, and s1 denotes no word break.

Figure 15:
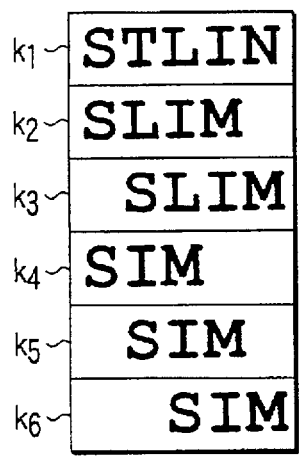
FIG. 15 is a view showing a set of categories relevant to the word dictionary shown in FIG. 14A to FIG. 14C.

FIG. 15 illustrates a set of categories. Each category includes position information, and thus, is different from the word dictionary 10. A category k1 is made of a word shown in FIG. 14A; categories k2 and k3 are made of words shown in FIG. 14B; and categories k4, k5, and k6 are made of words shown in FIG. 14C. Specifically, the category 1 is made of "STLIN"; the category 2 is made of "SLIM"; the category 3 is made of "SLIM"; the category k4 is made of "SLIM"; the category k5 is made of "SIM"; and the category k6 is made of "SLIM".

Character recognition is performed for each character pattern shown in FIG. 13 by the above described character recognition processing. The character recognition result is used for calculating the posteriori probability of each of the categories shown in FIG. 15. Although characteristics used for calculation (=character recognition result) are various, an example using characters specified as a first candidate is shown here.

In this case, the five characters "S, S, L, I, M" from the start (leftmost character) are obtained as character recognition results for each of the character patterns shown in FIG. 13.

Although a variety of characteristics of character spacing are considered, an example described in subsection 5.2.2 is shown here. FIG. 13 shows characteristics of character spacing. The first and second characters are free of being spaced from each other, and thus, the characteristics of character spacing are defined as "d2". The second and third characters are expanded in spacing, and thus, the characteristics of character spacing are defined as "d0". The third and fourth characters and the fourth and fifth characters are condensed in spacing, the characteristics of character spacing are defined as "d1".

When approximation described in subsection 5.2.1 is used, in accordance with the above formula 30, a change P (k1|rc)/P (k1) in a probability of generating a category k1, the change caused by knowing the character recognition result "S, S, L, I, M", is obtained by the following formula.

$$\frac{P(k_1|r_C)}{P(k_1)} \approx \frac{P(\text{"S"}|\text{"S"})}{P(\text{"S"})} \frac{P(\text{"S"}|\text{"T"})}{P(\text{"S"})} \cdot \frac{P(\text{"L"}|\text{"L"})}{P(\text{"L"})} \frac{P(\text{"I"}|\text{"I"})}{P(\text{"I"})} \frac{P(\text{"M"}|\text{"M"})}{P(\text{"M"})} \quad (33)$$

In accordance with the above formula 31, P (k1|rs)/P (k1) of the probability of an occurrence of category k1, a change caused by characteristics of character spacing shown in FIG. 14, is obtained by the following formula.

$$\frac{P(k_1|r_S)}{P(k_1)} \approx \frac{P(d_2|s_1)}{P(d_2)} \frac{P(d_0|s_0)}{P(d_0)} \frac{P(d_1|s_1)}{P(d_1)} \frac{P(d_1|s_1)}{P(d_1)} \quad (34)$$

If approximation described in subsections 3.2.2 and 4.2.2 is used to make calculation in accordance with the above formula 33, for example, when p=0.5 and n (E)=26, q=0.02. The above formula 33 is computed as follows.

$$\frac{P(k_1|r_C)}{P(k_1)} \approx p \cdot q \cdot p \cdot p \cdot q \cdot n(E)^5 \approx 594 \quad (35)$$

In order to make communication in accordance with the above formula 34, it is required to obtain the following formula in advance.

$$P(d_k|s_1)_{k=0,1,2} \; 1=0,1 \text{ and } P(d_k)_{k=0,1,2}$$

As an example, it is assumed that the following values in tables 1 and 2 are obtained.

TABLE 1

Values of P($d_k$, $s_1$)

| 1 | 0: Expanded ($d_0$) | 1: Condensed ($d_1$) | 2: No character spacing ($d_2$) | Total |
|---|---|---|---|---|
| 0: Word break ($s_0$) | P($d_0$, $s_0$) 0.16 | P($d_1$, $s_0$) 0.03 | P($d_2$, $s_0$) 0.01 | P($s_0$) 0.2 |
| 1: No word break ($s_1$) | P($d_0$, $s_1$) 0.04 | P($d_1$, $s_1$) 0.40 | P($d_2$, $s_1$) 0.36 | P($s_1$) 0.8 |
| Total | P($d_0$) 0.20 | P($d_1$) 0.43 | P($d_2$) 0.37 | 1 |

TABLE 2

Values of P($d_k$|$s_1$)

| 1 | 0: Expanded ($d_0$) | 1: Condensed ($d_1$) | 2: No character spacing ($d_2$) |
|---|---|---|---|
| 0: Word break ($s_0$) | P($d_0$|$s_0$) 0.8 | P($d_1$|$s_0$) 0.15 | P($d_2$|$s_0$) 0.05 |
| 1: No word break ($s_1$) | P($d_0$|$s_1$) 0.05 | P($d_1$|$s_1$) 0.50 | P($d_2$|$s_1$) 0.45 |

Table 1 lists values obtained by the following formula.

$$P(d_k \cap s_1)$$

Table 2 lists the values of P (dk|s1). In this case, note that a relationship expressed by the following formula is met.

$$P(d_k \cap s_1) = P(d_k|s_1)p(s_1)$$

In reality, P (dk|s1)/P (dk) is required for calculation using the above formula 34, and thus, the calculations are shown in table 3 below.

TABLE 3

Values of P($d_k$|$s_1$)/P($d_k$)

| 1 | 0: Expanded ($d_0$) | 1: Condensed ($d_1$) | 2: No character spacing ($d_2$) |
|---|---|---|---|
| 0: Word break ($s_0$) | P($d_0$|$s_0$) 4 | P($d_1$|$s_0$) 0.35 | P($d_2$|$s_0$) 0.14 |
| 1: No word break ($s_1$) | P($d_0$|$s_1$) 0.25 | P($d_1$|$s_1$) 1.16 | P($d_2$|$s_1$) 1.22 |

The above formula 34 is used for calculation as follows based on the values shown in table 3 above.

$$\frac{P(k_1|r_S)}{P(k_1)} \approx 1.22 \cdot 4 \cdot 1.16 \cdot 1.16 \approx 6.57 \quad (36)$$

From the above formula 29, a change P (k1|r)/P (k1) in a probability of generating the category k1, the change caused by knowing the characteristics recognition result "S, S, L, I, M" and the characteristics of character spacing is represented by a product between the above formulas 35 and 36, and is obtained by formula.

$$\frac{P(k_1|r)}{P(k_1)} \approx 594 \cdot 6.57 \approx 3900 \quad (37)$$

Similarly, p (ki|rc)/P (ki), P (ki|rs)/P (ki), P (ki|r)/P (ki) are obtained with respect to k2 to k6 as follows.

$$\frac{P(k_2|r_C)}{P(k_2)} \approx p \cdot q \cdot q \cdot q \cdot n(E)^4 \approx 1.83 \quad (38)$$

$$\frac{P(k_3|r_C)}{P(k_3)} \approx p \cdot p \cdot p \cdot p \cdot n(E)^4 \approx 28600$$

$$\frac{P(k_4|r_C)}{P(k_4)} \approx p \cdot q \cdot q \cdot n(E)^3 \approx 3.52$$

$$\frac{P(k_5|r_C)}{P(k_5)} \approx p \cdot q \cdot q \cdot n(E)^3 \approx 3.52$$

$$\frac{P(k_6|r_C)}{P(k_6)} \approx q \cdot p \cdot p \cdot n(E)^3 \approx 87.9$$

$$\frac{P(k_2|r_S)}{P(k_2)} \approx 1.22 \cdot 0.25 \cdot 1.16 \cdot 0.35 \approx 0.124 \quad (39)$$

$$\frac{P(k_3|r_S)}{P(k_3)} \approx 0.14 \cdot 0.25 \cdot 1.16 \cdot 1.16 \approx 0.0471$$

$$\frac{P(k_4|r_S)}{P(k_4)} \approx 1.22 \cdot 0.25 \cdot 0.35 \approx 0.107$$

$$\frac{P(k_5|r_S)}{P(k_5)} \approx 0.14 \cdot 0.25 \cdot 1.16 \cdot 0.35 \approx 0.0142$$

$$\frac{P(k_6|r_S)}{P(k_6)} \approx 4 \cdot 1.16 \cdot 1.16 \approx 5.38$$

-continued $$\frac{P(k_2|r)}{P(k_2)} \approx 1.83 \cdot 0.124 \approx 0.227 \quad (40)$$

$$\frac{P(k_3|r)}{P(k_3)} \approx 28600 \cdot 0.0471 \approx 1350$$

$$\frac{P(k_4|r)}{P(k_4)} \approx 3.52 \cdot 0.107 \approx 0.377$$

$$\frac{P(k_5|r)}{P(k_5)} \approx 3.52 \cdot 0.0142 \approx 0.0500$$

$$\frac{P(k_6|r)}{P(k_6)} \approx 87.9 \cdot 5.38 \approx 473$$

The maximum category in the above formulas 37 and 40 is "k1". Therefore, the estimation result is ST LIN.

In the method described in chapter 4, which does not use characteristics of character spacing, although the category "k3", that is maximum in the formulas 35 and 38 is the estimation result, it is found that the category "k1" believed to comprehensively match best is selected by integrating the characteristics of character spacing.

In this manner, in the second embodiment, the input character string corresponding to a word to be recognized is identified by each character, and the characteristics of character spacing are extracted by this character delimiting. In addition, recognition processing is performed for each character obtained by the above character delimiting. Then, there is obtained a probability at which the characteristics obtained as the result of character recognition are generated by conditioning characteristics of characters and character spacing of words contained in a word directory that stores in advance words to be recognized and candidates of characteristics of character spacing in a word. The thus obtained probability is divided by a probability at which there are generated characteristics obtained as the result of character recognition. Then, each of the above obtained calculation results relevant to characters of words contained in a word dictionary and characteristics of character spacing is multiplied for all the characters and character spacing. The recognition result of the above word is obtained based on this multiplication result.

That is, in word recognition using the character recognition result, an evaluation function is used based on a posteriori probability considering at least the ambiguity of word delimiting. In this way, even in the case where word delimiting is not reliable, word recognition can be performed precisely.

Now, a description will be given to Bayes Estimation according to a third embodiment of the present invention when no character spacing is provided or noise entry occurs. In this case, the Bayes Estimation is effective when no character spacing is provided or when noise entry cannot be ignored.

6. Integration of the Absence of Character Spacing and Noise Entry

The methods described in the foregoing chapters 1 to 5 assume that character is always identified correctly. If no character spacing is provided while this assumption is not met, the above methods cannot be used. In addition, these methods cannot be used to counteract noise entry. In this chapter, the Bayes Estimation that counteracts the absence of character spacing or noise entry is performed by changing categories.

6.1 Definition of Formulas

Definitions are added and changed as follows based on the definitions in chapter 5.

Changes

Category K={ki}

$k_i=(w_{jk}, h)$, $w_{jk} \in w$, w: A set of derivative character strings

In the foregoing description, "wd" may be expressed in place of "$w_{jk}$".

Addition

Derivative character string $W_{jk}=(W_{jk1}, W_{jk2}, \ldots, W_{jkL_{jk}}, w'_{jk0}, w'_{jk1}, \ldots, w'_{jkL_{jk}})$ $L_{jk}$: Number of characters in derivative character string "$w_{jk}$"

$w_{jkl}$: l-th character $W_{jk} \in C$ Of $W_{jk}$ $w'_{jk}$: Whether or not a word break occurs between l character and (l+1)-th character $w'_{jk1} \in S$, $w'_{jk0} w'_{jkL_{jk}} = s_0$ Relationship between derivative character string $w_{jk}$ and character string $\tilde{w}_j$ Assume that action $a_{jkl} \in A$ is acted between l-th character and (l+1) character in character string $\tilde{w}_j$, whereby a derivative character string $w_{jk}$ can be formed.

$A=\{a_0, a_1, a_2\}$ $a_0$: No action $a_1$: No character spacing $a_2$: Noise entry a0: No action Nothing is done for the character spacing.

a1: No character spacing

The spacing between the two characters is not provided. The two characters are converted into one non-character by this action.

Example: The spacing between T and A of ONTARIO is not provided. ON#RIO (# denotes a non-character by providing no character spacing.)

a2: Noise entry

A noise (non-character) is entered between the two characters.

Example: A noise is entered between N and T of ONT. ON*T (* denotes a non-character due to noise.)

However, when l=0, Lj, it is assumed that noises are generated at the left and right ends of a character spring "wc", respectively. In addition, this definition assumes that noise does not enter two or more characters continuously.

Non-character $\gamma \in C$

A non-character is identified as "γ" by considering the absence of character spacing or noise entry, and is included in character C.

At this time, a posteriori probability P (ki|r) is similar to that obtained by the above formulas 23 and 24.

$$P(k_i|r) = \frac{P(r_C|k_i)P(r_S|k_i)P(k_i)}{P(r_C, r_S)} \quad (41)$$

P (pc|ki) is substantially similar to that obtained by the above formula 25.

$$P(r_C|k_i) = P(r_{C1}, r_{C2}, \ldots, r_{Ch}|k_i) \left\{ \prod_{l=1}^{L_{jk}} P(r_{Ch+l}|w_{jkl}) \right\} \cdot \quad (42)$$

$$P(r_{Ch+L_{jk}+1}, \ldots, r_{CL}|k_i)$$

P (ps|ki) is also substantially similar to that obtained by the above formula 26.

$$P(r_S|k_i) = P(r_{S1}, r_{S2}, \ldots, r_{Sh-1}|k_i) \left\{ \prod_{l=0}^{L_{jk}} P(r_{Sh+1}|w'_{jkl}) \right\} \cdot \quad (43)$$

$$P(r_{Sh+L_{jk}+1}, \ldots, r_{SL-1}|k_i)$$

6.2 Description of P (ki)

Assume that P (wc) is obtained in advance. Here, although P (wc) is affected by the position in a letter or the position in line if the address of the mail P is actually read, for example, the P (wc) is assumed to be assigned as an expected value thereof. At this time, a relationship between P (wd) and P (wc) is considered as follows.

$$P(w_{jk}) = P(\tilde{w}j) \left\{ \prod_{l=1}^{L_j-1} P(a_{jkl}) \right\} P(a_{jk0}) P(a_{jkL_j}) \quad (44)$$

That is, the absence of character spacing and noise entry can be integrated with each other in a frame of up to five syllables by providing a probability of the absence of character spacing P (a1) and a noise entry probability P (*2). From the above formula 44, the following result is obtained.

$$P(a_{jk0}), P(a_{jkL_j})$$

This formula is a term concerning whether or not noise occurs at both ends. In general, probabilities at which noises exist are different from each other between characters and at both ends. Thus, a value other than noise entry probability P (a2) is assumed to be defined.

A relationship between P (wc) and P (wc, h) or a relationship between P (wd) and P (wd, h) depends on how the effects as described previously (such as position in a leter) are modeled and/or approximated. Thus, a description is omitted here.

6.3 Description of a Non-Character γ

Consider a case in which characters specified as a first candidate are used as character characteristics, as shown in subsection 3.2.1. When a non-character "γ" is extracted as characteristics, the characters generated as a first candidate are considered to be similarly probable. Then, such non-character is handled as follows.

$$P(e_i|\gamma) = \frac{1}{n(E)} \quad (45)$$

6.4 Specific Example

Figure 17:
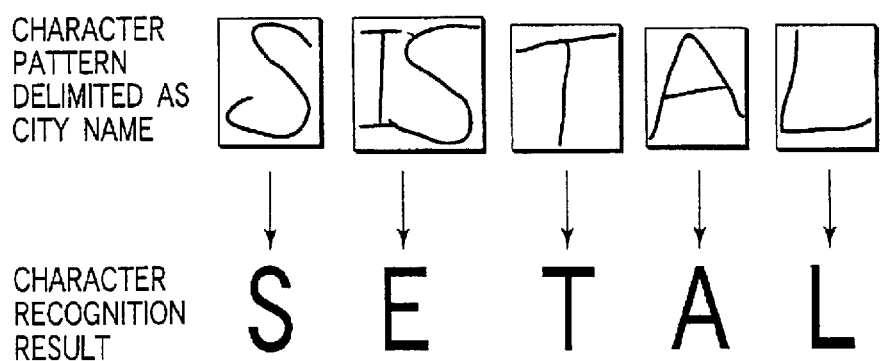
FIG. 17 is a view showing a character pattern identified as a city name.

As in subsection 5.3, for example, consider that a city name is read in address reading of a mail P in English, as shown in FIG. 17.

Figure 18:
FIG. 18 is a view showing the contents of a word dictionary.

In order to clarify the characteristics of this section, there is provided an assumption that word delimiting is completely successful, and a character string consisting of a plurality of words does not exist in a category. FIG. 17 shows the result of delimiting processing of a character pattern that corresponds to a portion at which it is believed that a city name identified by the above described delimiting processing is written, wherein a total of five characters are detected. The word dictionary 10 stores all city names, as shown in FIG. 18. In this case, three city names are stored as SITAL, PETAR, and STAL.

FIG. 19 illustrates a category set, wherein character strings each consisting of five characters are listed from among derivative character strings made based on the word dictionary 10. When all derivative character strings each consisting of five characters are listed, for example, "P#A*R" or the like deriving from "PETAR" must be included. However, in the case where a probability P (a) of the absence of character spacing or noise entry probability P (a2) described in section 6.2 is smaller than a certain degree, such characters can be ignored. In this example, such characters are ignored.

Categories k1 to k5 each are made of a word "SISTAL"; a category k6 is made of a word "PETAR"; and categories k7 to k11 each are made of a word "STAL". Specifically, the category k1 is made of "#STAL"; the category k2 is made of "S#TAL"; the category k3 is made of "SI#AL"; the category k4 is made of "SIS#L"; the category k5 is made of "SIST#"; the category k6 is made of "PETAR"; the category k7 is made of "*STAL"; the category k8 is made of "S*TAL"; the category k9 is made of "ST*AL"; the category k10 is made of "STA*L"; and the category k11 is made of "STA*L".

Character recognition is performed for each of the character patterns shown in FIG. 17 by the above described character recognition processing. The posteriori probability is calculated by each category shown in FIG. 19 by on the basis of the character recognition result obtained by such each character pattern.

Although characters used for calculation (=character recognition result) are various, an example using characters specified as a first candidate is shown here. In this case, the character recognition result is "S E, T, A, L" in order from the left-most character, relevant to each character pattern shown in FIG. 17. In this way, in accordance with the above formula 16, a change P (k2|r)/P (k2) in a probability of generating the category k2 (S#TAL) shown in FIG. 2, the change caused by knowing the character recognition result, is obtained as follows.

$$\frac{P(k_2|r)}{P(k_2)} \approx \frac{P(\text{``S''}|\text{``S''})}{P(\text{``S''})} \frac{P(\text{``E''}|\text{``\#''})}{P(\text{``E''})} \cdot \quad (46)$$

$$\frac{P(\text{``T''}|\text{``T''})}{P(\text{``T''})} \frac{P(\text{``A''}|\text{``A''})}{P(\text{``A''})} \frac{P(\text{``L''}|\text{``L''})}{P(\text{``L''})}$$

Further, by using approximation described in section 3.2 and subsection 4.2.2, for example, when p=0.5 and n (E)=26, q=0.02. Thus, the above formula 46 is used for calculation as follows.

$$\frac{P(k_2|r)}{P(k_2)} \approx P \cdot \frac{1}{n(E)} \cdot p \cdot p \cdot p \cdot n(E)^5 \quad (47)$$

$$= p \cdot p \cdot p \cdot p \cdot n(E)^4 \approx 28600$$

Referring now to the above calculation process, this calculation is equivalent to calculation of four characters other than non-characters. Similarly, the other categories are calculated. Here, k6, k7, and k8 easily estimated to indicate large values are calculated as a typical example.

$$\frac{P(k_6|r)}{P(k_6)} \approx q \cdot p \cdot p \cdot p \cdot q \cdot n(E)^5 \approx 594 \quad (48)$$

$$\frac{P(k_7|r)}{P(k_7)} \approx \frac{1}{n(E)} \cdot q \cdot p \cdot p \cdot n(E)^5$$

$$= q \cdot p \cdot p \cdot p \cdot n(E)^4 \approx 1140$$

-continued $$\frac{P(k_8|r)}{P(k_8)} \approx p \cdot \frac{1}{n(E)} \cdot p \cdot p \cdot p \cdot n(E)^5$$
$$= p \cdot p \cdot p \cdot p \cdot n(E)^4 \approx 28600$$

In comparing these values, chapter 5 assumes that the values of P (ki) is equal to each other. However, in this section, as described in section 6.2, a change occur with P (ki) by considering the absence of character spacing or noise entry. Thus, all the values of P (ki) before such change occurs is assumed to be equal to each other, and P (ki)=P0 is defined. P0 can be considered to be P (wc) in the above formula 44. In addition, P (ki) after such change has occurred is considered to be P (wd) in the above formula 44. Therefore, p (ki) after such change has occurred is obtained as follows.

$$P(k_i) = P_0 \left\{ \prod_{l=1}^{L_j-1} P(a_{jkl}) \right\} P(a_{jk0}) P(a_{jkL_j}) \quad (49)$$

In this formula, assuming that a probability of the absence of character spacing P (a1)=0.05, a probability of noise entry into character space P (a0)=0.002, a probability of noise entry into both ends is P' (a2)=0.06, for example, P (k2) is calculated as follows.

$$P(k_2) = P_0 \cdot 0.948 \cdot 0.05 \cdot 0.948 \cdot 0.948 \cdot 0.948 \cdot 0.94 \cdot 0.94 \approx 0.0357 P_0 \quad (50)$$

In calculation, a probability when neither character spacing nor noise entry occurs P (a0)=1−P (a1)−P (a2)=0.948 is used, and a probability free of noise entry at both ends P' (a0)= 1−P' (a2)=0.94 is used.

Similarly, when P (k6), P (k7), and P (k8) are calculated, the following result is obtained.

$$P(k_6) = P_0 \cdot 0.948 \cdot 0.948 \cdot 0.948 \cdot 0.948 \cdot 0.94 \cdot 0.94 \quad (51)$$
$$\approx 0.714 P_0$$

$$P(k_7) = P_0 \cdot 0.948 \cdot 0.948 \cdot 0.948 \cdot 0.06 \cdot 0.94$$
$$\approx 0.0481 P_0$$

$$P(k_8) = P_0 \cdot 0.002 \cdot 0.948 \cdot 0.948 \cdot 0.94 \cdot 0.94$$
$$\approx 0.00159 P_0$$

When the above formulas 50 and 51 are changed by using the above formulas 47 and 48, the following result is obtained.

$$P(k_2|r) \approx 28600 \cdot 0.0357 P_O \approx 1020 P_O \quad (52)$$

$$P(k_6|r) \approx 594 \cdot 0.714 P_O \approx 424 P_O$$

$$P(k_7|r) \approx 1140 \cdot 0.0481 P_O \approx 54.8 P_O$$

$$P(k_8|r) \approx 286000 \cdot 00159 P_O \approx 45.5 P_O$$

When the other categories are calculated similarly as a reference, the following result is obtained.

$$P(k_1|r) \approx 40.7 P_O, P(k_3|r) \approx 40.7 P_O,$$

$$P(k_4|r) \approx 1.63 P_O, P(k_5|r) \approx 0.0653 P_O,$$

$$P(k_9|r) \approx 1.81 P_O, P(k_{10}|r) \approx 0.0727 P_O,$$

$$P(k_{11}|r) \approx 0.0880 P_O$$

Figure 16:
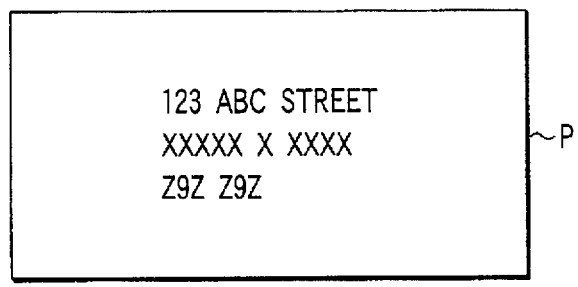
FIG. 16 is a view showing a description example of a mail on which an address is described.

From the foregoing, the highest posteriori probability is the category k2, and it is estimated that the city name written in FIG. 16 is SISTAL, and no character spacing between I and S is provided.

As described above, according to the third embodiment, the characters of words contained in a word dictionary include information on non-characters as well as characters. In addition, a probability of generating words each consisting of characters that include non-character information is set based on a probability of generating words each consisting of characters that do not include any non-character information. In this manner, word recognition can be performed by using an evaluation function based on a posteriori probability considering the absence of character spacing or noise entry. Therefore, even in the case where no character spacing is provided or noise entry occurs, word recognition can be performed precisely.

Now, a description will be given to Bayes Estimation according to a fourth embodiment of the present invention when a character is not identified uniquely. In this case, the Bayes Estimation is effective for characters with delimiters such as Japanese Kanji characters or Kana characters. In addition, the Bayes Estimation is also effective to calligraphic characters in English which includes a case where many break candidates other than actual character breaks must be presented.

7. Integration of Character Delimiting

The methods described in chapters 1 to 6 assume that characters themselves are not delimited. However, there is a case in which characters such as Japanese Kanji or Kana characters themselves are delimited into two or more. For example, in a Kanji character "明", when character delimiting is performed, "日" and "月" are identified separately as character candidates. At this time, a plurality of character delimiting candidates appear depending on whether these two character candidates are integrated with each other or separated from each other.

Such character delimiting cannot be achieved by the method described in chapters 1 to 6. Conversely, in the case where many characters free of being spaced from each other are present, and are subjected to delimiting processing, the characters themselves as well as actual character contacted portions may be cut. Although it will be described later in detail, it would be better to permit cutting of characters themselves to a certain extent as a strategy of recognition. In this case as well, the methods described in characters 1 to 6 cannot be used similarly. In this chapter, Bayes Estimation is performed which corresponds to a plurality of character delimiting candidates caused by character delimiting.

7.1 Character Delimiting

In character delimiting targeted for character contact, processing for cutting a character contact is performed. In this processing, when a case in which a portion that is not a character break is specified as a break candidate is compared with a case in which a character break is not specified as a break candidate, the latter affects recognition. The reasons are stated as follows.

When a portion that is not a character break is specified as a break candidate

A case in which a character break is executed at a character break and a case in which such character break is not performed can be attempted. Thus, if two much breaks occur, correct character delimiting is not always performed.

When a character break is not specified as a break candidate

There is no means for obtaining correct character delimiting.

Therefore, in character delimiting, it is effective to specify many break candidates other than character breaks. However, when a case in which a character break is performed at a break candidate and a case in which such break is not performed is attempted, it means that there are a plurality of character delimiting patterns. In the methods described in chapters 1 to 6, comparison between different character delimiting pattern candidates cannot be performed. Therefore, a method described here is used to solve this problem.

7.2 Definition of Formulas

The definitions are added and changed as follows based on the definitions in chapter 6.

Changes

Break state set S={s0, s1, s2, (, s3)} s0: Word break s1: Character break s2: No character break (s3: Start or end of line)

"Break" defined in chapter 5 and subsequent means a word break, which falls into s0. "No break" falls into s1 and s2.

L: Number of portions divided at a break candidate (referred to as cell)

Addition unit uij (i≦j)

This unit is combined between i-th cell and (j−i)-th cell.

Change

Category K={ki}

$k_i = (W_{jk}, m_{jk}, h)$, $w_j \in W$ $m_{jk} = (m_{jk1}, m_{jk2}, \ldots, m_{jkL_{jk}}, m_{jkL_{jk}}+1)$ $m_{jk1}$: Start cell number of unit to which character "$w_{jkl}$" applies. The unit can be expressed as "$u_{m_{jkl}}{}^m jkl+1$.

h: A position of a derivable character string "$w_{jk}$". A derivative character string "$w_{jk}$" starts from a (h+1)-th cell.

Addition

Break pattern $k'_i = (k'_{i0}, k'_{i1}, \ldots, k'_{iL_C})$ $k'_i$: Break state in $k_i$ $L_C$: Total number of cells included in all units to which a derivative character string "$w_{jk}$" applies.

$L_C = m_{jkL_{jk+1}} - m_{jk1}$ $k'_{il}$: State $k'_{il} \in S$ in a break between (h+1)-th cell and (h+1+1)-th cell $$k'_{il} = \begin{cases} s_0 \text{(when a word break occurs, namely,} \\ \quad \text{when } \exists_n, w'_{jkn} = s_0, l = m_{jkn+1} - h - 1) \\ s_2 \text{(when } \forall_n, l \neq m_{jkn} - h - 1) \\ s_1 \text{(when a case other than the above occurs)} \end{cases}$$

Change

Character characteristics $r_C = (r_{C12}, r_{C13}, r_{C14}, \ldots, r_{C1L+1}, R_{C23}, r_{C24}, \ldots, r_{C2L+1}, \ldots, r_{CLL+1})$ $r_{Cn_1n_2}$: Character characteristics of unit $u_{n_1n_2}$ Characteristics of character spacing $r_S = (r_{S0}, r_{S1}, \ldots, r_{SL})$ $r_{Sn}$: Characteristics of character spacing between n-th cell and (n+1)-th cell At this time, a posterior probability P (ki|r) is similar to the above formulas 23 and 24.

$$P(k_i|r) = \frac{P(r_C|k_i)P(r_S|k_i)P(k_i)}{P(r_C, r_S)} \tag{53}$$

P (rc|ki) is represented as follows.

$$P(r_C|k_i) = P(r_{Cm_{jk1}m_{jk2}} | w_{jk1})P(r_{Cm_{jk2}m_{jk3}} | w_{jk2}) \ldots \cdot \tag{54}$$

$$P(r_{Cm_{jkL_{jk}}m_{jkL_{jk}+1}} | w_{jkL_{jk}}) \cdot$$

$$P(\ldots, r_{n_1n_2}, \ldots |k_i)$$

それ以外の $(n_1 n_2)$ $$= \left\{ \prod_{n=1}^{L_{jk}} P(r_{Cm_{jkn}m_{jkn+1}} | w_{jkn}) \right\} \cdot$$

$$\left\{ \begin{array}{c} P(\ldots, r_{n_1n_2}, \ldots |k_i) \\ n_1, n_2 \\ \forall_{b, 1 \leq b \leq L_{jk}, (n_1, n_2) \neq (m_{jkb}, m_{jkb+1})} \end{array} \right\}$$

P (rs|ki) is represented as follows.

$$P(r_S|k_i) = P(r_{S1}, r_{S2}, \ldots, r_{Sh-1} | k_i) \cdot \tag{55}$$

$$P(r_{Sh}|k'_{i0})P(r_{Sh+1}|k'_{i1}) \ldots P(r_{Sh+L_C} | k'_{iL_C}) \cdot$$

$$P(r_{Sh+L_C+1}, \ldots, r_{SL-1} | k_i)$$

In P (ki), "mjk" is contained in a category "ki" in this section, and thus, the effect of the "mjk" should be considered. Although it is considered that the "mjk" affect the shape of a unit to which individual characters apply, characters that apply to such unit, a balance in shape between the adjacent units or the like, a description of its modeling will be omitted here.

7.3 Approximation for Practical Use 7.3.1 Approximation Relevant to a Portion Free of a Character String and Normalization of the Number of Characters When approximation similar to that in subsection 4.2.1 is used for the above formula 54, the following result is obtained.

$$P(r_C|k_i) \approx \prod_{n=1}^{L_{jk}} P(r_{Cm_{jkn}m_{jkn+1}} | w_{jkn}) \tag{56}$$

$$\prod_{\substack{n_1, n_2 \\ \forall_{b, 1 \leq b \leq L_{jk}, (n_1, n_2) \neq (m_{jkb}, m_{jkb+1})}}} P(r_{Cn_1n_2})$$

In reality, it is considered that there is any correlation among "r cn1n3", "r cn1n2", and "r cn2n3", and thus, this approximation is more coarse than that described in subsection 4.2.1.

In addition, when the above formula 55 is approximated similar, the following result is obtained.

$$P(r_S|k_i) = \prod_{n=0}^{L_C} P(r_{Sh+n}|k'_{in}) \prod_{\substack{1 \leq n \leq h-1 \\ h+L_C+1 \leq n \leq L-1}} P(r_{Sn}) \tag{57}$$

Further, when P (ki|r)/P (ki) is calculated in a manner similar to that described in subsection 5.2.1, the following result is obtained.

$$\frac{P(k_i|r)}{P(k_i)} \approx \frac{P(k_i|r_C)}{P(k_i)} \frac{P(k_i|r_S)}{P(k_i)} \tag{58}$$

-continued $$\approx \prod_{n=1}^{L_{jk}} \frac{P(r_{Cm_{jkn}m_{jkn}+1}|w_{jkn})}{P(r_{Cm_{jkn}m_{jkn}+1})} \prod_{n=0}^{L_C} \frac{P(r_{Sh+n}|k'_{in})}{P(r_{Sh+1})}$$

As in the above formula 32, with respect to the above formula 58, there is no description concerning a portion at which a derivative character string "wd" applies, and "normalization by denominator" can be performed.

7.3.2 Break and Character Spacing Characteristics "rs"

Unlike chapters 1 to 6, in this subsection, s2 (No character break) is specified as a break state. Thus, in the case where characteristics of character spacing set D is used as a set of character spacing characteristics in a manner similar to that described in subsection 5.2.2, the following result is obtained.

$$P(d_k|s_1)_{k=0,1,2 \ 1=0,1,2}$$

It must be noted here that all of these facts are limited to a portion specified as "a break candidate", as described in section 7.1. s2 (No character break) means that a character is specified as a break candidate, but no break occur. This point should be noted when a value is obtained by using the formula below.

$$P(d_k|s_2)_{k=0,1,2}$$

This applies to a case in which a value is obtained by using the formula below.

$$P(d_k)_{k=0,1,2}$$

7.4 Specific Example

As in section 6.4, consider that a city name is read in address reading of mail P written in English.

For clarifying the characteristics of this section, it is assumed that word delimiting is completely successful; a character string consisting of a plurality of words does not exist in a category, no noise entry occurs, and all the character breaks are detected by character delimiting (That is, unlike section 6, there is no need for category concerning noise or space-free character).

FIG. 20 shows a portion at which it is believed that a city name is written, and five cells are present. FIG. 21A to FIG. 21D show possible character delimiting pattern candidates. In this example, for clarity, it is assumed that the spacing between cells 2 and 3 and the spacing between cells 4 and 5 are always found to have been delimited (a probability at which characters are not delimited is very low, and may be ignored).

Figure 22:
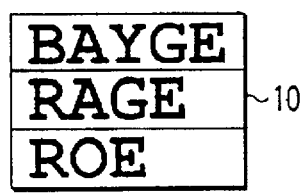
FIG. 22 is a view showing the contents of a word dictionary.

The delimiting candidates are present between cells 1 and 2 and between cells 3 and 4. The possible character delimiting pattern candidates are exemplified as shown in FIG. 21A to FIG. 21D. FIG. 22 shows the contents of the word directory 10 in which all city names are stored. In this example, there are three candidates for city names.

In this case, three city names are stored as BAYGE, RAGE, and ROE.

FIG. 23A to FIG. 23D each illustrate a category set. It is assumed that word delimiting is completely successful. Thus, NAYGE applies to FIG. 21A; RAGE applies to FIG. 21B and FIG. 21C; and ROE applies to FIG. 21D.

Figure 23A:
FIG. 23A to FIG. 23D are views showing a set of categories relevant to the word dictionary shown in FIG. 22.
Figure 23B:

In the category k1 shown in FIG. 23A, the interval between cells 1 and 2 and that between cells 3 and 4 correspond to separation points between characters. In the category k2 shown in FIG. 23B, the interval between cells 1 and 2 corresponds to a separation point between characters, while the interval between cells 3 and 4 does not.

Figure 23C:

In the category k3 shown in FIG. 23C, the interval between cells 3 and 4 corresponds to a separation point between characters, while the interval between cells 1 and 2 does not.

Figure 23D:

In the category k4 shown in FIG. 23D, the interval between cells 1 and 2 and that between cells 3 and 4 does not correspond to separation points between characters.

Each of the units that appear in FIG. 23A to FIG. 21D is applied to character recognition, and the character recognition result is used for calculating the posteriori probabilities of the categories shown in FIG. 23A to FIG. 23D. Although characteristics used for calculation (=character recognition result) are various, an example using characters specified as a first candidate is shown below.

Figure 24:
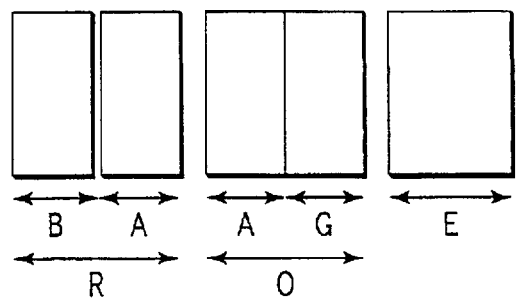
FIG. 24 is a view showing the recognition result of each unit relevant to the character delimiting pattern candidate.

FIG. 24 shows the recognition result of each unit. For example, this figure shows that a first place of the recognition result has been R in a unit having cells 1 and 2 connected to each other. Although it is considered that character spacing characteristics are various, an example described in subsection 5.2.2 is summarized here, and the following is used.

Set of character spacing characteristics D'={d'1, d'2} d'1: Character spacing d'2: No character spacing

FIG. 27 shows characteristics of character spacing between cells 1 and 2, and between cells 3 and 4. Character spacing is provided between cells 1 and 2, and no character spacing is provided between cells 3 and 4.

When approximation described in subsection 7.3.1 is used, in accordance with the above formula 58, a change P (k1|rc)/P (k1) of a probability of generating category "k1" (BAYGE), the change caused by knowing the recognition result shown in FIG. 24, is obtained by the following formula.

$$\frac{P(k_1|r_C)}{P(k_1)} \approx \frac{P(\text{``B''}|\text{``B''})}{P(\text{``B''})} \frac{P(\text{``A''}|\text{``A''})}{P(\text{``A''})} \cdot \qquad (59)$$

$$\frac{P(\text{``A''}|\text{``Y''})}{P(\text{``A''})} \frac{P(\text{``G''}|\text{``G''})}{P(\text{``G''})} \frac{P(\text{``E''}|\text{``E''})}{P(\text{``E''})}$$

Figure 25:
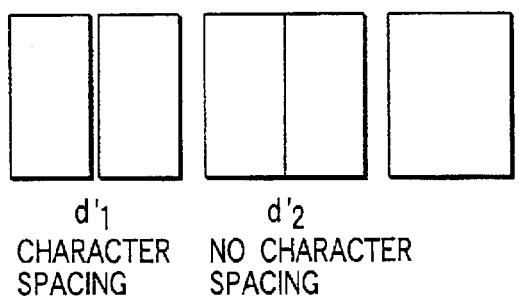
FIG. 25 is a view showing characteristics of character intervals.

In the above formula 58, a change P (ki|rs)/P (ki) caused by knowing characteristics of character spacing shown in FIG. 25 is obtained by the following formula.

$$\frac{P(k_1|r_s)}{P(k_1)} \approx \frac{P(d'_1|s_1)}{P(d'_1)} \frac{P(d'_2|s_1)}{P(d'_2)} \qquad (60)$$

In order to make a calculation using the above formula 59, when approximation described in subsections 3.2.2 and 4.2.2 is used, for example, when p=0.5 and n (E)=26, q=0.02. Thus, the above formula 59 is used for calculation as follows.

$$\frac{P(k_1|r_C)}{P(k_1)} \approx p \cdot p \cdot q \cdot p \cdot p \cdot n(E)^5 \approx 14900 \qquad (61)$$

In order to make calculation using the above formula 60, it is required to establish the following formula in advance.

$$P(d'_k|s_1)_{k=1,2 \ 1=1,2} \text{ and } P(d'_k)_{k=1,2}$$

As an example, it is assumed that the following values shown in tables 4 and 5 are obtained.

TABLE 4

Values of $P(d_k', s_1)$

| 1 | k | | |
|---|---|---|---|
| | 1: Character spacing ($d_1'$) | 2: No Character spacing ($d_2'$) | Total |
| 1: Character break ($s_1$) | $P(d_1', s_1)$ 0.45 | $P(d_2', s_1)$ 0.05 | $P(s_1)$ 0.5 |
| 2: No Character break ($s_2$) | $P(d_1', s_2)$ 0.01 | $P(d_2', s_2)$ 0.49 | $P(s_2)$ 0.5 |
| Total | $P(d_1')$ 0.46 | $P(d_2')$ 0.54 | 1 |

TABLE 5

Values of $P(d_k'|s_1)$

| 1 | k | |
|---|---|---|
| | 1: Character spacing ($d_1'$) | 2: No character spacing ($d_2'$) |
| 1: Character break ($s_1$) | $P(d_1'|s_1)$ 0.90 | $P(d_2'|s_1)$ 0.10 |
| 2: No character break ($s_2$) | $P(d_1'|s_2)$ 0.02 | $P(d_2'|s_2)$ 0.98 |

Table 4 lists values obtained by formula.

$$P(d'_k \cap s_1)$$

Table 5 lists values of P (d'k|s1). In this case, note that a relationship shown by the following formula is met.

$$P(d'_k \cap s_1) = P(d'_k|s_1)p(s_1)$$

In reality, P (d'k|s1)/P (d'k) is required for calculation using the above formula 60. Thus, Table 6 lists the thus calculated values.

TABLE 6

Values of $P(d_k'|s_1)/P(d_k')$

| 1 | k | |
|---|---|---|
| | 1: Character spacing ($d_1'$) | 2: No character spacing ($d_2'$) |
| 1: Character break ($s_1$) | $P(d_1'|s_1)$ 1.96 | $P(d_2'|s_1)$ 0.19 |
| 2: No character break ($s_2$) | $P(d_1'|s_2)$ 0.043 | $P(d_2'|s_2)$ 1.18 |

The above formula 60 is used for calculation as follows, based on the above values shown in Table 6.

$$\frac{P(k_1|r_S)}{P(k_1)} \approx 1.96 \cdot 0.19 \approx 0.372 \tag{62}$$

From the above formula 60, a change P (k1|r)/P (k1) caused by knowing the character recognition result shown in FIG. 24 and the characteristics of character spacing shown in FIG. 25 is represented by a product between the above formulas 61 and 62, and the following result is obtained.

$$\frac{P(k_1|r)}{P(k_1)} \approx 14900 \cdot 0.372 \approx 5543 \tag{63}$$

Similarly, with respect to k2 to k4 as well, when P (ki|rc)/ P (ki), P (ki|rs)/P (ki), and P (ki|r)/P (ki) are obtained, the following result is obtained.

$$\frac{P(k_2|r_C)}{P(k_2)} \approx q \cdot p \cdot q \cdot p \cdot n(E)^4 \approx 45.7 \tag{64}$$

$$\frac{P(k_3|r_C)}{P(k_3)} \approx p \cdot p \cdot p \cdot p \cdot n(E)^4 \approx 28600$$

$$\frac{P(k_4|r_C)}{P(k_4)} \approx p \cdot p \cdot p \cdot n(E)^3 = 2197$$

$$\frac{P(k_2|r_S)}{P(k_2)} \approx 1.96 \cdot 1.81 \approx 3.55 \tag{65}$$

$$\frac{P(k_3|r_S)}{P(k_3)} \approx 0.043 \cdot 0.19 \approx 0.00817$$

$$\frac{P(k_4|r_S)}{P(k_4)} \approx 0.043 \cdot 1.81 \approx 0.0778$$

$$\frac{P(k_2|r)}{P(k_2)} \approx 45.7 \cdot 3.55 \approx 162 \tag{66}$$

$$\frac{P(k_3|r)}{P(k_3)} \approx 28600 \cdot 0.00817 \approx 249$$

$$\frac{P(k_4|r)}{P(k_4)} \approx 2197 \cdot 0.0778 \approx 171$$

In comparing these results, although it is assumed that values of P (ki) are equal to each other in chapters 1 to 5, the shape of characters is considered in this section.

In FIG. 21D, the widths of units are the most uniform. in FIG. 21A, these widths are the second uniform. However, in FIG. 21B and FIG. 21C, these widths are not uniform.

A degree of this uniformity is modeled by a certain method, and the modeled degree is reflected in P (ki), thereby enabling more precise word recognition.

As long as such precise word recognition is achieved, any method may be used here.

In this example, it is assumed that the following result is obtained.

$$P(k_1):P(k_2):P(k_3):P(k_4)=2:1:1:10 \tag{67}$$

When a proportion content Pi is defined, and the above formula 67 is deformed by using the formulas 63 and 66, the following result is obtained.

$$P(k_1|r) \approx 5543 \cdot 2P_1 \approx 11086P_1$$

$$P(k_2|r) \approx 162 \cdot P_1 \approx 162P_1$$

$$P(k_3|r) \approx 249 \cdot P_1 \approx 249P_1$$

$$P(k_4|r) \approx 171 \cdot 10P_1 \approx 1710P_1$$

From the foregoing, it is assumed that the highest posteriori probability is category "ki", and a city name is BAYGE.

As the result of character recognition shown in FIG. 24, the highest priority is category k3 caused by the above formulas 61 and 64. As the result of character spacing characteristics shown in FIG. 25, the highest priority is category k2 caused by the above formulas 62 and 65. Although the highest value in evaluation of balance in character shape is category k4, estimation based on all integrated results is performed, whereby category k1 can be selected.

In this manner, according to the fourth embodiment, an input character string corresponding to a word to be recognized is delimited for each character; plural kinds of delimiting results are obtained considering character spacing by this character delimiting; recognition processing is performed for each of the characters specified as all of the obtained delimiting results; and a probability at which there appears characteristics obtained as the result of character recognition by conditioning characteristics of the characters and character spacing of the words contained in a word dictionary that stores candidates of the characteristics of a word to be recognized and character spacing of the word. In addition, the thus obtained probability is divided by a probability at which there appears characteristics obtained as the result of character recognition; each of the above calculation results obtained for each of the characteristics of the characters and character spacing of the words contained in the word dictionary is multiplied relevant to all the characters and character spacing, and the recognition result of the above word is obtained based on the multiplication result.

That is, in word recognition using the character recognition result, an evaluation function based on the posteriori probability is used in consideration of at least the ambiguity of character delimiting. In this manner, even in the case where character delimiting is not reliable, word recognition can be performed precisely.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A word identification method comprising:
    a character recognition processing step of performing recognition processing of an input character string that corresponds to a word to be recognized by each character, thereby obtaining the character recognition result;
    a probability calculation step of obtaining a probability at which characteristics obtained as the character recognition result are generated by said character recognition processing by conditioning characters of words contained in a word dictionary that stores in advance a candidate of the word to be recognized;
    a first computation step of dividing the probability obtained by said probability calculation step by a probability of generation of the characteristics obtained as the character recognition result by said character recognition processing step;
    a second computation step of performing multiplication for each of division results obtained by said first computation relevant to the characteristics of the words contained in said word dictionary; and
    a word recognition processing step of obtaining the recognition result of said word based on multiplication results obtained by this second computation step.

2. A word recognition method according to claim 1, wherein information on characters and non-characters is included in the characters of the words contained in said word dictionary.

3. A word recognition method according to claim 2, wherein a probability at which a word containing information on said non-characters is generated is set based on a probability at which a word that does not contain non-character information is generated.

4. A word recognition method according to claim 1, wherein said character recognition processing step comprises:
    delimiting an input character string that corresponds to the word to be recognized by each character;
    extracting characteristics of character spacing by this character delimiting; and
    performing recognition processing of each character obtained by said character delimiting,
    wherein said probability calculation step is used to obtain a probability generated based on the characteristics obtained as the result of character recognition by conditioning the characteristics of characters and character spacing of the words contained in a word dictionary that stores in advance candidates of the characteristics of character spacing in words to be recognized.

5. A storage medium that stores a word recognition program according to claim 4, wherein said step of extracting characteristics of character spacing comprises:
    obtaining plural kinds of delimiting results considering whether character spacing is provided or not by character delimiting caused by said character delimiting step; and
    extracting characteristics of character spacing relevant to all of the delimiting results obtained by this step.

6. A storage medium that stores a word recognition program according to claim 1, wherein said character recognition processing step comprises:
    delimiting an input character string that corresponds to a word to be recognized by each character;
    extracting characteristics of character spacing by this character delimiting; and
    performing recognition processing of each character obtained by said character delimiting.

7. A storage medium that stores a word recognition program according to claim 6, wherein said step of extracting characteristics of character spacing comprises:
    obtaining plural kinds of delimiting results considering whether character spacing is provided or not by character delimiting caused by said character delimiting step; and
    extracting characteristics of character spacing relevant to all of the delimiting results obtained by this step.

8. A word identification method comprising:
    a character recognition processing step of performing recognition processing of an input character string that corresponds to a word to be recognized by each character, thereby obtaining the character recognition result;
    a probability calculation step of obtaining a probability at which characteristics obtained as the character recognition result are generated by said character recognition processing by conditioning characters of words contained in a word dictionary that stores in advance a candidate of the word to be recognized;
    a first computation step of performing a predetermined computation between the probability obtained by said probability calculation step and the characteristics obtained as the character recognition result by said character recognition processing step;
    a second computation step of performing a predetermined second computation between the computation results obtained by said first computation relevant to the characteristics of the words contained in said word dictionary; and a word recognition processing step of obtaining the recognition result of said word based on the second computation result by this second computation step, wherein said character recognition processing step consists of the steps of delimiting an input character string that corresponds to the word to be recognized by each character;

extracting characteristics of character spacing by this character delimiting; and performing recognition processing of each character obtained by said character delimiting, wherein said probability calculation step is used to obtain a probability generated based on the characteristics obtained as the result of character recognition by conditioning the characteristics of characters and character spacing of the words contained in a word dictionary that stores in advance candidates of the characteristics of character spacing in words to be recognized.

9. A word recognition method comprising:

a delimiting step of delimiting an input character string that corresponds to a word to be recognized by each character;

a step of obtaining plural kinds of delimiting results considering whether character spacing is provided or not by character delimiting caused by this delimiting step;

a character recognition processing step of performing recognition processing for each character as all the delimiting results obtained by this step;

a probability calculation step of obtaining a probability at which characteristics obtained as the result of character recognition are generated by said character recognition step by computing the characters of the words contained in the word dictionary that stores in advance candidates of words to be recognized;

a first computation step of performing a predetermined first computation between a probability obtained by this probability computation step and a probability at which characteristics obtained as the result of character recognition are generated by said character recognition processing step;

a second computation step of performing a predetermined computation between computation results obtained by said first computation relevant to each of the characters of the words contained in said word dictionary; and a word recognition processing step of obtaining the recognition result of said word based on the result of the second calculation caused by this second computation step.

10. A word recognition method according to claim 9, wherein said character recognition step consists of the steps of:

obtaining plural kinds of delimiting results considering whether character spacing is provided or not by character delimiting caused by said character delimiting step;

extracting characteristics of character spacing relevant to all the delimiting results obtained by this step; and performing recognition processing of each character as all of the said obtained delimiting results, wherein said probability calculation step is used to obtain a probability at which characteristics obtained as the result of character recognition are generated by conditioning characteristics of the characters and character spacing of words contained in the word dictionary that stores in advance candidates of the characteristics of character spacing in words to be recognized.

11. A computer readable storage medium that stores a word recognition program for performing word recognition processing in a computer, wherein said word recognition program contains:

a character recognition processing step of performing recognition processing of an input character string that corresponds to a word to be recognized by each character;

a probability calculation step of obtaining a probability at which characteristics obtained as the character recognition result are generated by said character recognition processing by conditioning characters of words contained in a word dictionary that stores in advance a candidate of the word to be recognized;

a first computation step of dividing the probability obtained by said probability calculation step by a probability of generation of the characteristics obtained as the character recognition result by said character recognition processing step;

a second computation step of performing multiplication for each of division results obtained by said first computation relevant to the characteristics of the words contained in said word dictionary; and a word recognition processing step of obtaining the recognition result of said word based on multiplication results obtained by this second computation step.

12. A word recognition method according to claim 11, wherein information on characters and non-characters is included in the characters of the words contained in said word dictionary.

13. A word recognition method according to claim 12, wherein a probability at which a word containing information on said non-characters is generated is set based on a probability at which a word that does not contain non-character information is generated.

14. A word recognition method according to claim 11, wherein said character recognition processing step comprises:

delimiting an input character string that corresponds to the word to be recognized by each character;

extracting characteristics of character spacing by this character delimiting; and performing recognition processing of each character obtained by said character delimiting, wherein said probability calculation step is used to obtain a probability generated based on the characteristics obtained as the result of character recognition by conditioning the characteristics of characters and character spacing of the words contained in a word dictionary that stores in advance candidates of the characteristics of character spacing in words to be recognized.

15. A storage medium that stores a word recognition program according to claim 14, wherein said step of extracting characteristics of character spacing comprises:

obtaining plural kinds of delimiting results considering whether character spacing is provided or not by character delimiting caused by said character delimiting step; and extracting characteristics of character spacing relevant to all of the delimiting results obtained by this step.

16. A storage medium that stores a word recognition program according to claim 11, wherein said character recognition processing step comprises:

delimiting an input character string that corresponds to a word to be recognized by each character;

extracting characteristics of character spacing by this character delimiting; and performing recognition processing of each character obtained by said character delimiting.

17. A storage medium that stores a word recognition program according to claim 16, wherein said step of extracting characteristics of character spacing comprises:

obtaining plural kinds of delimiting results considering whether character spacing is provided or not by character delimiting caused by said character delimiting step; and extracting characteristics of character spacing relevant to all of the delimiting results obtained by this step.

18. A computer readable storage medium that stores a word recognition program for performing word recognition processing in a computer, wherein said word recognition program contains:

a character recognition processing step of performing recognition processing of an input character string that corresponds to a word to be recognized by each character;

a probability calculation step of obtaining a probability at which characteristics obtained as the character recognition result are generated by said character recognition processing by conditioning characters of words contained in a word dictionary that stores in advance a candidate of the word to be recognized;

a first computation step of performing a predetermined computation between the probability obtained by said probability calculation step and the characteristics obtained as the character recognition result by said character recognition processing step;

a second computation step of performing a predetermined second computation between the computation results obtained by said first computation relevant to the characteristics of the words contained in said word dictionary; and a word recognition processing step of obtaining the recognition result of said word based on the second computation result by this second computation step, wherein said character recognition processing step consists of the steps of delimiting an input character string that corresponds to the word to be recognized by each character;

extracting characteristics of character spacing by this character delimiting; and performing recognition processing of each character obtained by said character delimiting, wherein said probability calculation step is used to obtain a probability generated based on the characteristics obtained as the result of character recognition by conditioning the characteristics of characters and character spacing of the words contained in a word dictionary that stores in advance candidates of the characteristics of character spacing in words to be recognized.

19. A storage medium that stores a word recognition program according to claim 18, wherein said step of extracting characteristics of character spacing consists of the steps of:

obtaining plural kinds of delimiting results considering whether character spacing is provided or not by character delimiting caused by said character delimiting step; and extracting characteristics of character spacing relevant to all of the delimiting results obtained by this step.

20. A computer readable storage medium that stores a word recognition program for performing word recognition processing in a computer, wherein said word recognition program contains:

a character recognition processing step of performing recognition processing of an input character string that corresponds to a word to be recognized by each character;

a probability calculation step of obtaining a probability at which characteristics obtained as the character recognition result are generated by said character recognition processing by conditioning characters of words contained in a word dictionary that stores in advance a candidate of the word to be recognized;

a first computation step of performing a predetermined computation between the probability obtained by said probability calculation step and the characteristics obtained as the character recognition result by said character recognition processing step;

a second computation step of performing a predetermined second computation between the computation results obtained by said first computation relevant to the characteristics of the words contained in said word dictionary: and a word recognition processing step of obtaining the recognition result of said word based on the second computation result by this second computation step, wherein said character recognition processing step consists of the steps of:

delimiting an input character string that corresponds to a word to be recognized by each character;

extracting characteristics of character spacing by this character delimiting; and performing recognition processing of each character obtained by said character delimiting.

* * * * *